United States Patent [19]

Kobayashi

[11] Patent Number: 5,436,961

[45] Date of Patent: Jul. 25, 1995

[54] METHOD OF ACCOUNTING FEES IN SWITCHING SYSTEM AND APPARATUS FOR PERFORMING SAME

[75] Inventor: Toshiyuki Kobayashi, Kawasaki, Japan

[73] Assignee: Fujitsu Limited, Kawasaki, Japan

[21] Appl. No.: 747,048

[22] Filed: Aug. 19, 1991

[30] Foreign Application Priority Data

Aug. 20, 1990 [JP] Japan ................................. 2-218644

[51] Int. Cl.$^6$ ...................... H04M 1/64; H04M 15/00
[52] U.S. Cl. ........................................ 379/67; 379/88; 379/89; 379/91; 379/114; 379/201
[58] Field of Search ...................... 379/67, 114, 89, 88, 379/91

[56] References Cited

U.S. PATENT DOCUMENTS

| | | | |
|---|---|---|---|
| 4,602,129 | 7/1986 | Matthews et al. | 379/89 |
| 4,649,563 | 3/1987 | Riskin | 379/88 |
| 4,932,042 | 6/1990 | Baral et al. | 379/88 |
| 4,935,956 | 6/1990 | Hellwarth et al. | 379/88 |
| 5,033,079 | 7/1991 | Catron et al. | 379/100 |
| 5,036,533 | 7/1991 | Carter et al. | 379/63 |

FOREIGN PATENT DOCUMENTS

| | | |
|---|---|---|
| 53-23219 | 3/1978 | Japan . |
| 0278959 | 11/1990 | Japan | 379/14 |

OTHER PUBLICATIONS

Bell System Technical Journal, vol. 61, No., 5 May 1982, New York US, pp. 863–883, G. W. Gates et al. "1A Voice Storage System: Software".

AT & T Technology, vol. 4, No. 2, 1989, Short Hills, N.J. US, XP86281 M. R. Croak "Unified Messaging Will Deliver The Message".

Review of the Electrical Communications Laboratories, vol. 1, 35, No. 6, Nov. 1987, Tokyo Japan, pp. 613–612, Kawanaka et al "Voice Mail System".

International Switching Symposium 1990, vol. 1, May 1990, Stockholm, Sweden pp. 137–142, XP130833, Berger et al, "AT&T VoiceMark Messaging Service-A New Voice Store and Forward Service".

*Primary Examiner*—James L. Dwyer
*Assistant Examiner*—Fan Tsang
*Attorney, Agent, or Firm*—Nikaido, Marmelstein, Murray & Oram

[57] ABSTRACT

A switching system having at least an electronic exchange, a mail service system and an accounting system. When a mail service demanding subscriber requests the provision of mail service such as facsimile and voice to a plurality of other subscribers, the accounting system can issue a bill to the service demanding subscriber by employing an accounting ID coupling unit in the mail system and an accounting ID separation unit in the electronic exchange. The accounting ID indicating the service demanding subscriber is coupled to each of the terminating numbers of the service receiving subscribers, and then separated therefrom in the electronic exchange to give the same to the accounting system, while the terminating numbers are used for an exchange of calls.

19 Claims, 23 Drawing Sheets

Fig. 10
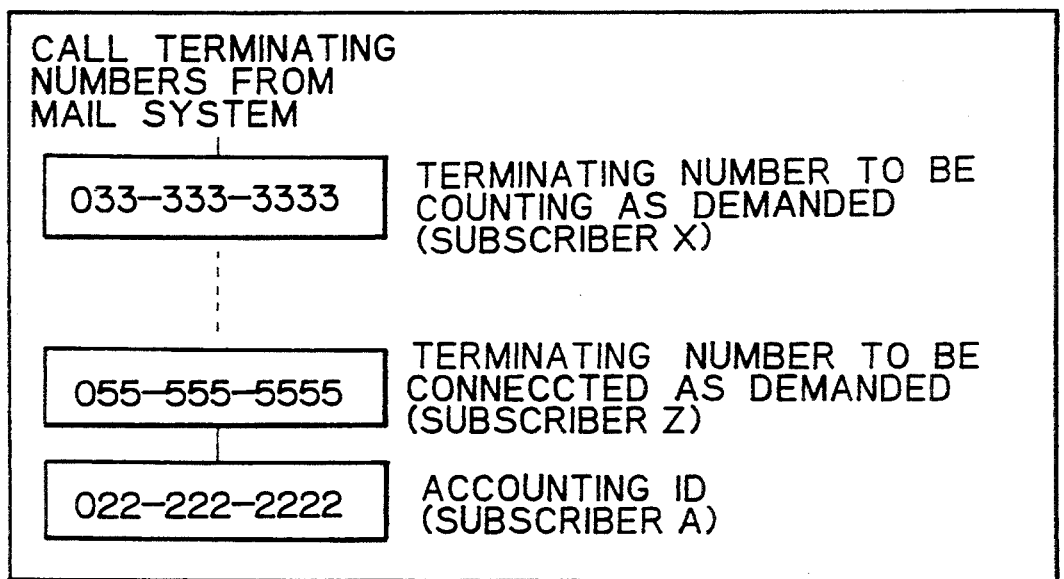
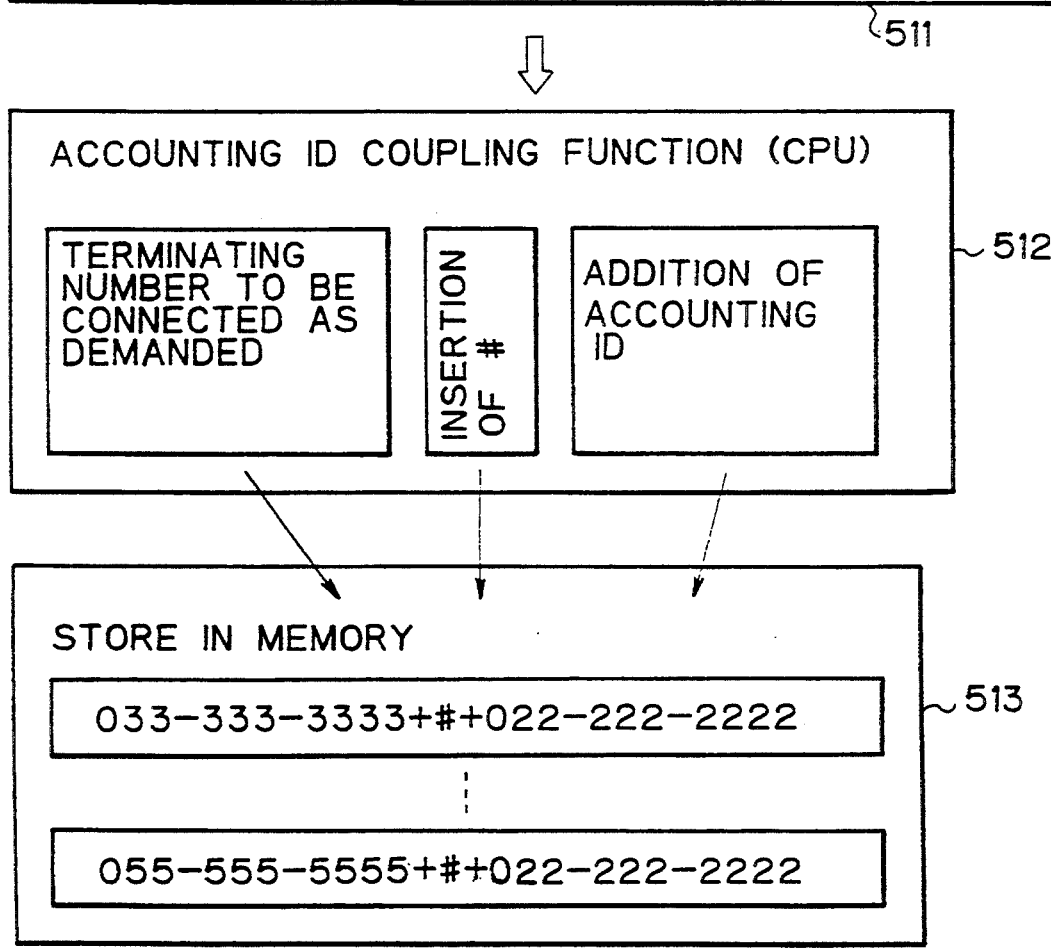

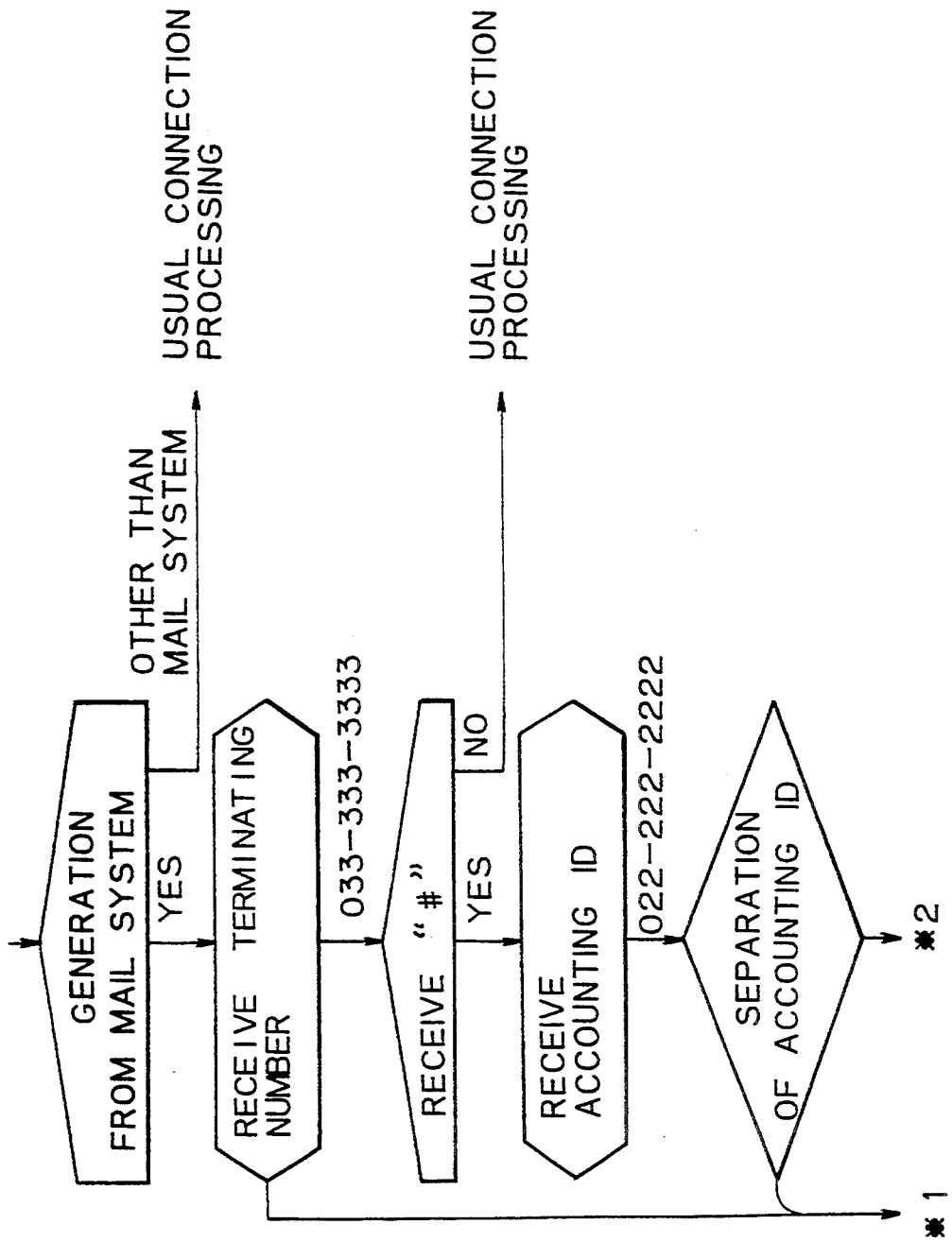

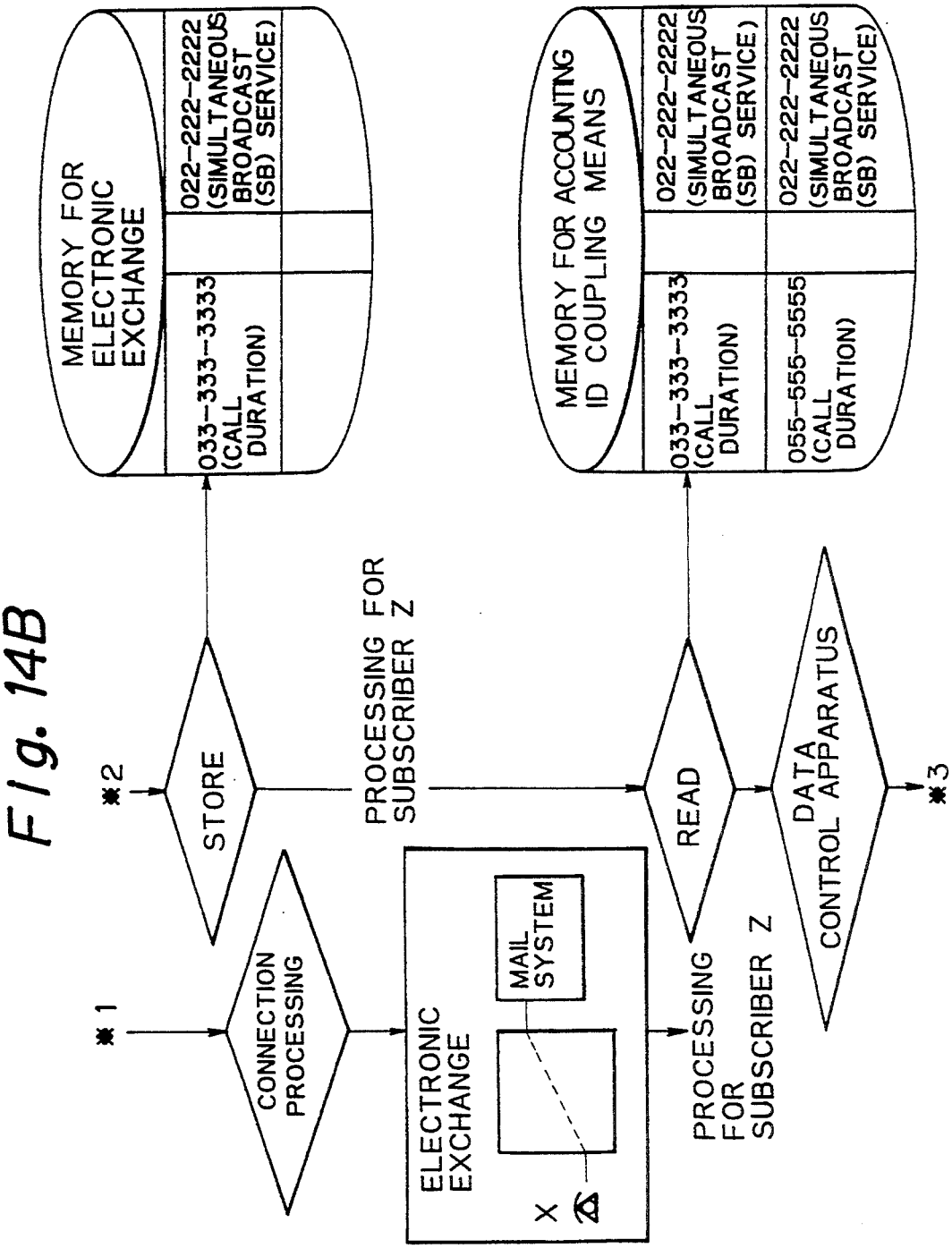

METHOD OF ACCOUNTING FEES IN SWITCHING SYSTEM AND APPARATUS FOR PERFORMING SAME

BACKGROUND OF THE INVENTION

1. Field of the Invention

The present invention relates to a method of accruing fees in a switching system, and an apparatus for performing the same.

The switching system to which the present invention refers is composed of an electronic exchange, a plurality of subscriber terminal equipment units connected to the electronic exchange, for performing a communication therebetween, a mail storage means, (i.e., a mail system) connected to the electronic exchange for providing a variety of mail services demanded by each call originating subscriber to one or more call terminating subscribers, and an accounting means connected to the electronic exchange, for accruing fees to be charged to persons specified by each call originating subscriber.

The mail system (mail storage means) contains a mail box and registers various mail services of voice, facsimile and broadcasts such as etc. conference announcements, commercial information, to the mail box when requested by a service demand subscriber of the telephone exchange. Then the mail system (mail storage means) sends the voice, facsimile, announcements or information to the telephones or the facsimiles of a plurality of the requested call terminating subscribers, at the same time or sequentially, or at a specified time. In this case, the subscriber is normally charged a service fee for the related communication to the service requesting subscriber.

2. Description of the Related Art

When levying a communication fee for a telephone exchange, the fee is generally charged to a call originating subscriber. Namely, the charging method is such that, when a call is originated, the related exchange extension is determined and a fee in accordance with the call duration, call distance and call rate is calculated with respect to the thus-determined exchange extension. In the above method of charging, the extension used for the connection (service) is determined to be a charged person.

Contrary to the above, when performing the mail service, for example a broadcast service, a call originating subscriber is regarded as a person who has merely demanded (requested) a connection service to the mail system having a service function. This means that an actual connection (service) call to a call terminating subscriber originated from the exchange extension connected to the mail system. Therefore, the exchange extension to which the fee is to be charged is not the call originating extension connected to the actual charged person, (i.e., the mail service requesting subscriber), but the call originating extension connected to the mail system. Thus, the accounting information regarding the call originating exchange extensions is collected separately at the accounting apparatus. In this case, however, one of the exchange extensions deals with call request services requested from not only the above exchange extension but also other exchange extensions, and therefore, it is impossible to distinguish the accounting for the subscribers to be charged, (i.e., the mail service requesting subscribers), individually.

As mentioned above, according to the prior art method applied in the case of the mail service and so on, a call originating exchange extension connected to a subscriber to be charged the fee, i.e., a mail service requesting subscriber, does not coincide with the call originating exchange extension connected to the mail system, and thus a problem occurs in that it is impossible to charge the fee to the subscribers to be charged individually.

SUMMARY OF THE INVENTION

Therefore, an object of the present invention is to allow charging the fee to the subscribers individually when a service demanding subscriber demands mail service to be transferred by telephone, a facsimile or the like to the mail system, even if a call originating exchange extension to be connected to a service demanding subscriber is different from a call originating exchange extension actually used for performing the related service.

To attain the above object, the present invention is realized by registering, in the mail system, an accounting identification (ID) (i.e., a number indicating to whom the fee is to be charged) together with a telephone number of each call terminating subscriber.

BRIEF DESCRIPTION OF THE DRAWINGS

The above object and features of the present invention will be more apparent from the following description of the preferred embodiments with reference to the accompanying drawings, wherein:

FIG. 10 is a schematic view of an accounting ID coupling means;

FIGS. 14A, 14B and 14C are schematic views for explaining a function of an accounting ID separation means;

DESCRIPTION OF THE PREFERRED EMBODIMENTS

Before describing the embodiments of the present invention, the prior art and the problems therein will be first described with reference to the related figures.

It should be noted that the following explanation will be made by taking a simultaneous broadcast service as an example, as the present invention is most effective when applied to the simultaneous broadcast service.

Figure 1:
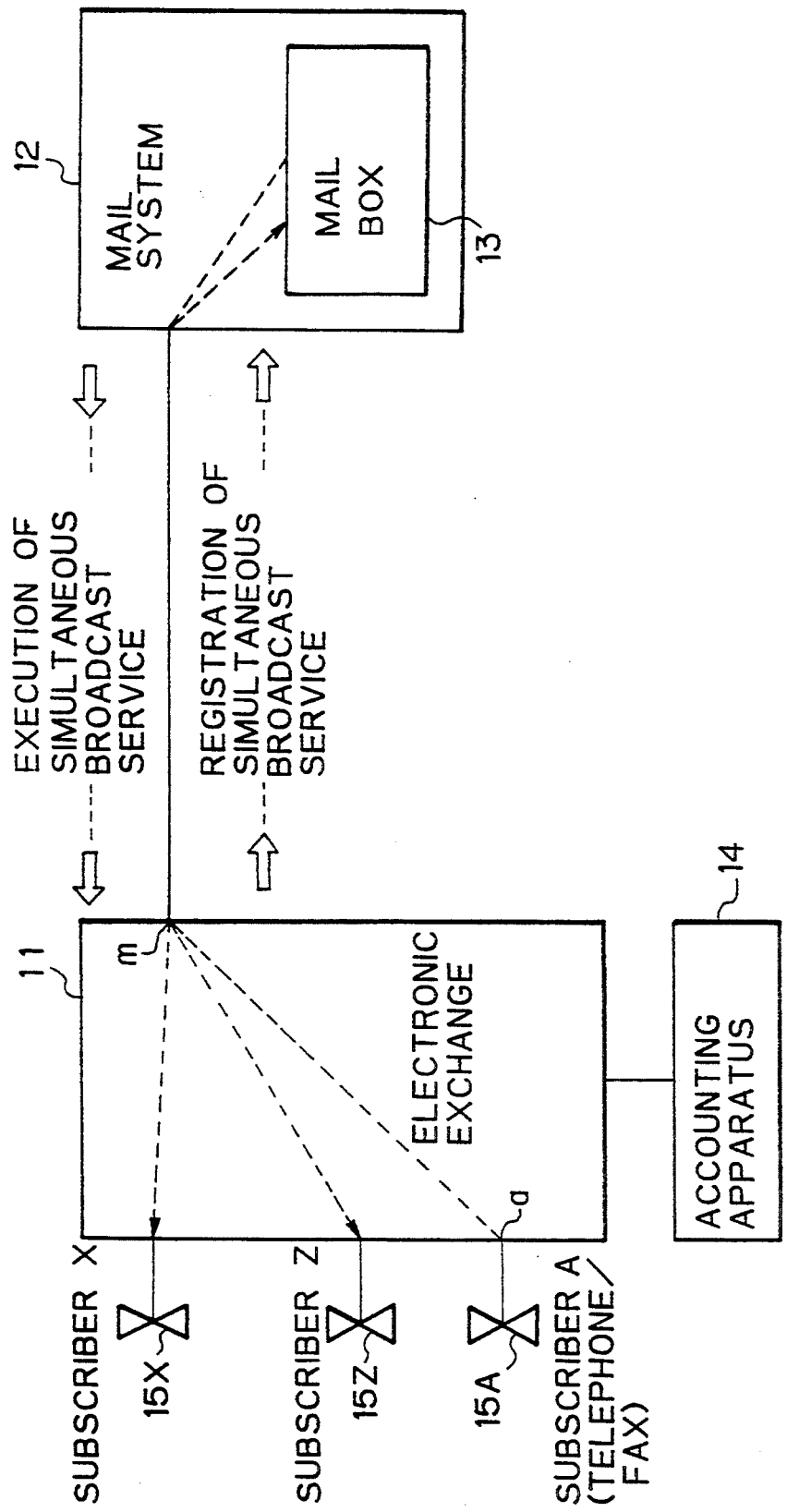
FIG. 1 illustrates a system construction of a simultaneous broadcast service by a mail system in a switching system.

FIG. 1 illustrates a system construction of a simultaneous broadcast service by a mail system in a switching system. In the figure, 11 represents an electronic exchange, 12 a mail system (mail storage means), 13 a mail box, and 14 an accounting apparatus.

The mail system 12 contains a mail box 13 and registers various services of the simultaneous broadcast such as conference announcements, commercial information, etc. to the mail box 13 at the request of a service demand subscriber A of the electronic exchange 11. Then the mail system 12 sends the above announcements or information to the telephones or the facsimiles of a plurality of the requested call terminating subscribers X through Z at the same time or sequentially, or at a specified time. In this case, the subscriber is normally charged a service fee for the related simultaneous communication to the service requesting subscriber A.

As mentioned before, when performing the simultaneous broadcast, in the case of the system construction illustrated in FIG. 1, a call originating subscriber A is regarded as a person who has merely demanded (requested) a connection service to another system, i.e., the mail system 12 having a service function. This means that an actual connection (service) call to a call terminating subscriber originated from the exchange extension "m" connected to the mail system 12. Therefore, the exchange extension to which the fee is to be charged is not the call originating extension "a" connected to the actual charged person (i.e., the simultaneous broadcast requesting subscriber), but the call originating extension "m" connected to the mail system 12. Thus, the accounting information regarding the call originating extensions "a" and "m" is collected separately at the accounting apparatus 14. In this case, however, the extension "m" deals with a call request service requested from not only the above exchange extension "a" but also other exchange extensions. Therefore, it is impossible to distinguish the accounting for the subscribers to be charged (i.e., the simultaneous broadcast requesting subscribers), individually.

The above-mentioned problem can be solved according to the present invention, and thus the switching system can charge the related broadcast service fee to the subscriber A, while leaving the existing accounting apparatus 14 as it is.

Figure 2:
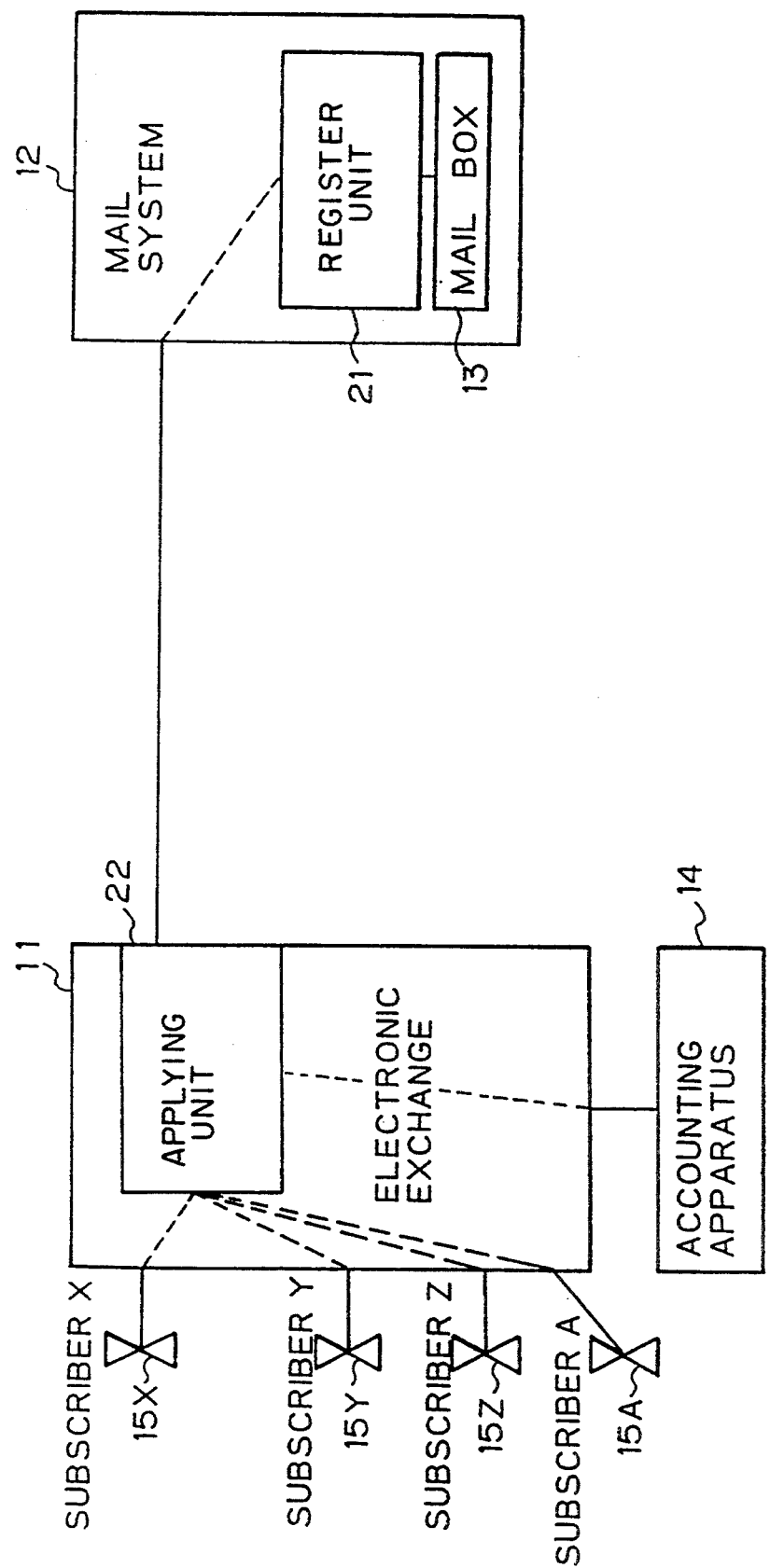
FIG. 2 is a general view of a switching system according to the present invention.

FIG. 2 is a general view of a switching system according to the present invention. In the figure, the switching system, as in the prior art, is basically comprised of an electronic exchange 11, a plurality of subscriber's terminal equipment 15 (15A, 15X . . . ) connected to the electronic exchange 11 to perform communication therebetween, a mail system (mail storage means) 12 connected to the electronic exchange 11 to provide a variety of mail services demanded by each call originating subscriber (15A) to one or more call terminating subscribers (15X, 15Y . . . ), and an accounting means 14, connected to the electronic exchange 11, for accounting fees to be charged to persons specified by each call originating subscriber.

The present invention, as shown in FIG. 2, incorporates, a first means 21 for registering an accounting identification (ID) to respective terminating numbers of the call terminating subscribers to whom the mail service is to be given, which is mounted in the mail system 12; and a second means 22 for applying each terminating number given from the mail system 12 to the electronic exchange 11, and applying both the terminating number and the corresponding accounting ID given from the mail system 12 to the said accounting means 14, which is mounted in the electronic exchange 11.

The present invention is able to provide a variety of mail services. For example, (i) the mail service is provided, as a simultaneous broadcast service, to a plurality of specified call terminating subscribers, and (ii) the mail system is operative as a facsimile mail system and/or voice mail system.

In the above examples (i) and (ii), the mail service (i) is provided to a plurality of specified call terminating subscribers sequentially, and the mail service (ii) is provided to each of specified call terminating subscribers at respective specified times and days.

Figure 3:
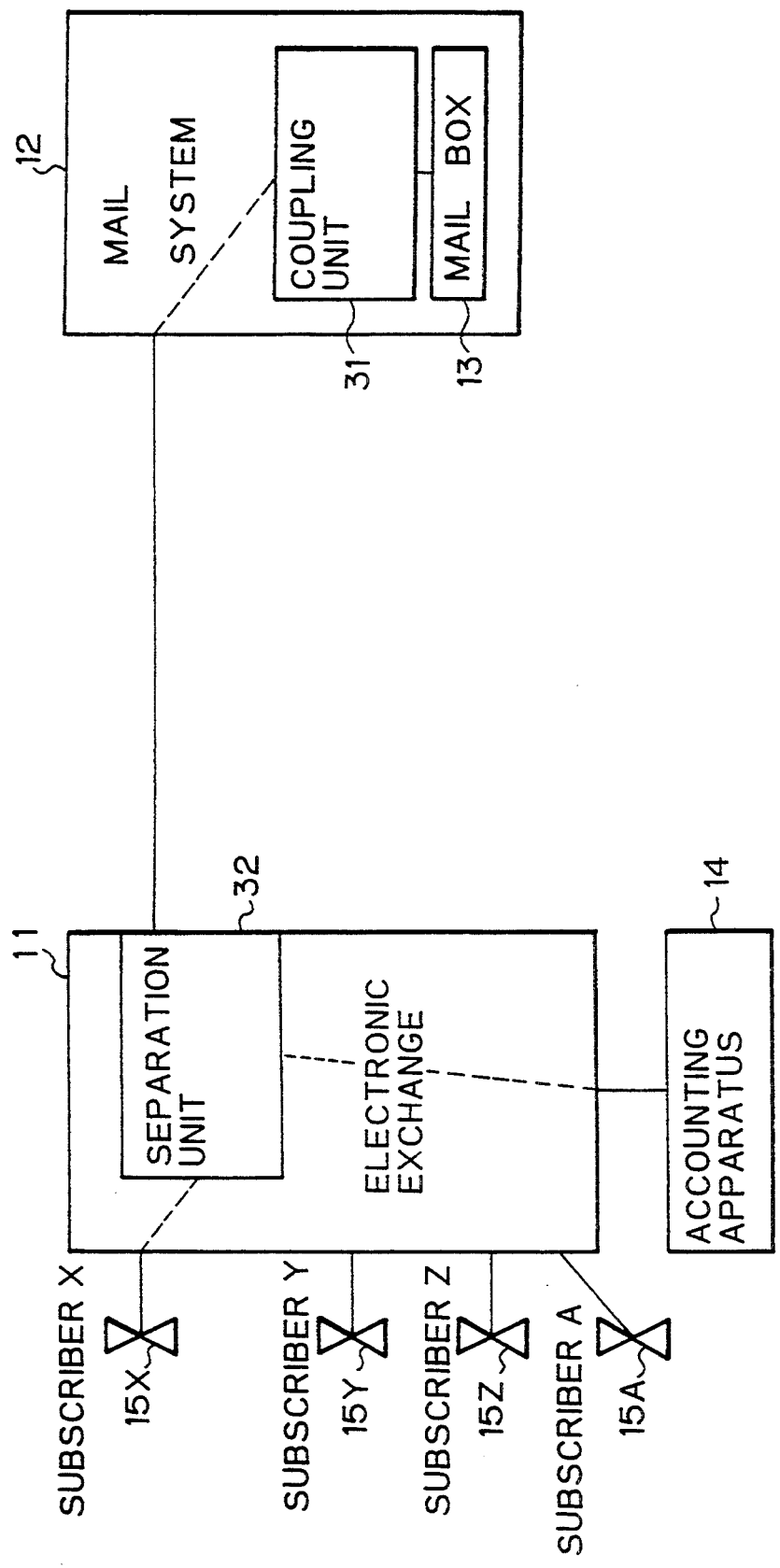
FIG. 3 is a view of a switching system illustrating in more detail the system of FIG. 2.

FIG. 3 is a view of a switching system in more detail than in FIG. 2. In the figure, the first means 21 shown in FIG. 2 is comprised of a coupling unit 31 which operates to couple the terminating number to the accounting ID.

The second means 22 shown in FIG. 2 is comprised of a separation unit 32 which operates to separate the accounting ID from the terminating number, so that the terminating number per se is supplied to the electronic exchange 11 but both the terminating number and the corresponding accounting ID are sent to the accounting means 14.

Figures 4, 5:
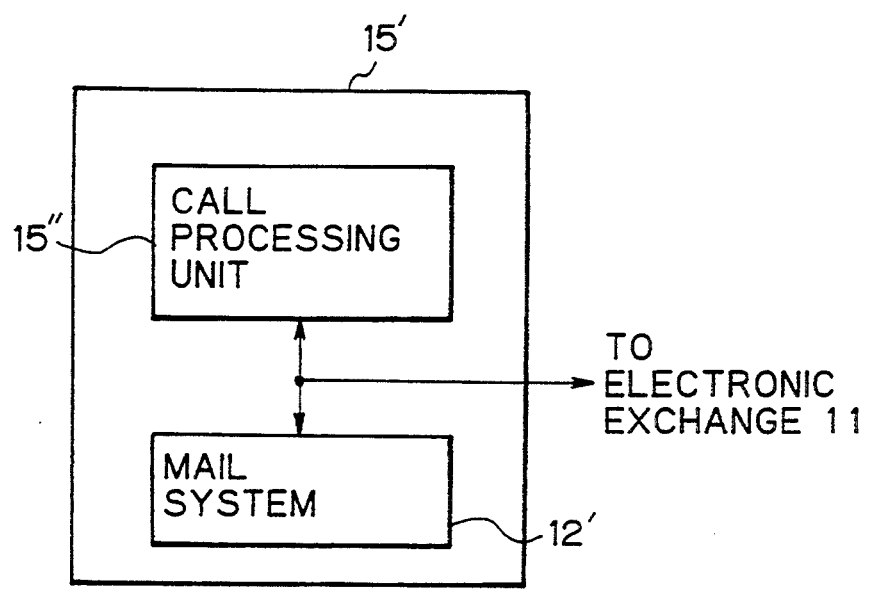
FIG. 4 is a view showing a modified example of a subscriber's terminal equipment.
FIG. 5 is a plan view of general a key-board for producing a push button signal.

FIG. 4 is a view showing a modified example of a subscriber's terminal equipment. The mail system 12 was illustrated as additional hardware at the electronic exchange 11, but the mail system 12 can be located at the subscriber side, as shown by a mail system 12' in FIG. 4. The mail system 12' (i.e., a private mail system) is mounted in a subscriber's terminal equipment 15' together with the usual call processing unit 15", as in the aforesaid subscriber's terminal equipment 15.

The mail system 12' can be included in one or more subscriber's terminal equipment.

A method according to the present invention is adopted in the aforesaid switching system, as follows:

(i) First step

When the service demanding subscriber (e.g., subscriber A) demands his mail service be stored in the mail system 12, an accounting identification (ID) which is specified by him, is registered therein in addition to one or more terminating numbers of the call terminating subscribers (e.g., subscribers X, Y . . . ) to be connected as demanded, to provide his mail service.

(ii) Second step

When the mail system 12 calls the call terminating subscribers in order to give them the stored mail service, the terminating numbers of the call terminating subscribers to the electronic exchange are sent in addition to the registered accounting ID.

(iii) Third step

In the electronic exchange 11, a connection to each call terminating subscriber is performed in accordance with the terminating numbers sent from the mail system 12, and at the same time, the accounting information is sent to the accounting means 14 containing both the terminating numbers and the accounting ID sent from the mail system, to thus charge the fee to the persons specified by the call originating subscribers, respectively.

In the above method, the accounting ID can be expressed in the form of a telephone number.

As mentioned previously, the mail service can be provided, as a simultaneous broadcast service, to a plurality of specified call terminating subscribers.

Further, the mail service is provided to a plurality of specified call terminating subscribers sequentially, or the mail service is provided to each of specified call terminating subscribers at a respective specified time and day.

Furthermore, the mail system is operative as a facsimile mail system and/or voice mail system.

In the aforesaid first step, a further step is included for adding a particular symbol to distinguish the accounting ID from each of the terminating numbers of the call terminating subscribers, wherein the particular symbol is used, in the electronic exchange, to separate the accounting ID from each terminating number.

The above-mentioned particular symbol is a special code determined in advance in the switching system.

The above-mentioned particular symbol can be selected as the function buttons # or * generally used for generating a push button signal a1.

The above-mentioned particular symbols # or * issued from the call originating subscriber can be commonly used for distinguishing from each other, in the aforesaid first step, the plurality of terminating numbers to be connected as demanded.

FIG. 5 is a plan view of a general key-board for producing a push button signal from a push button telephone. In the figure, the aforesaid particular symbols * and # are arranged with the ten numeric keys; these symbols are usually used as function keys.

Figure 6:
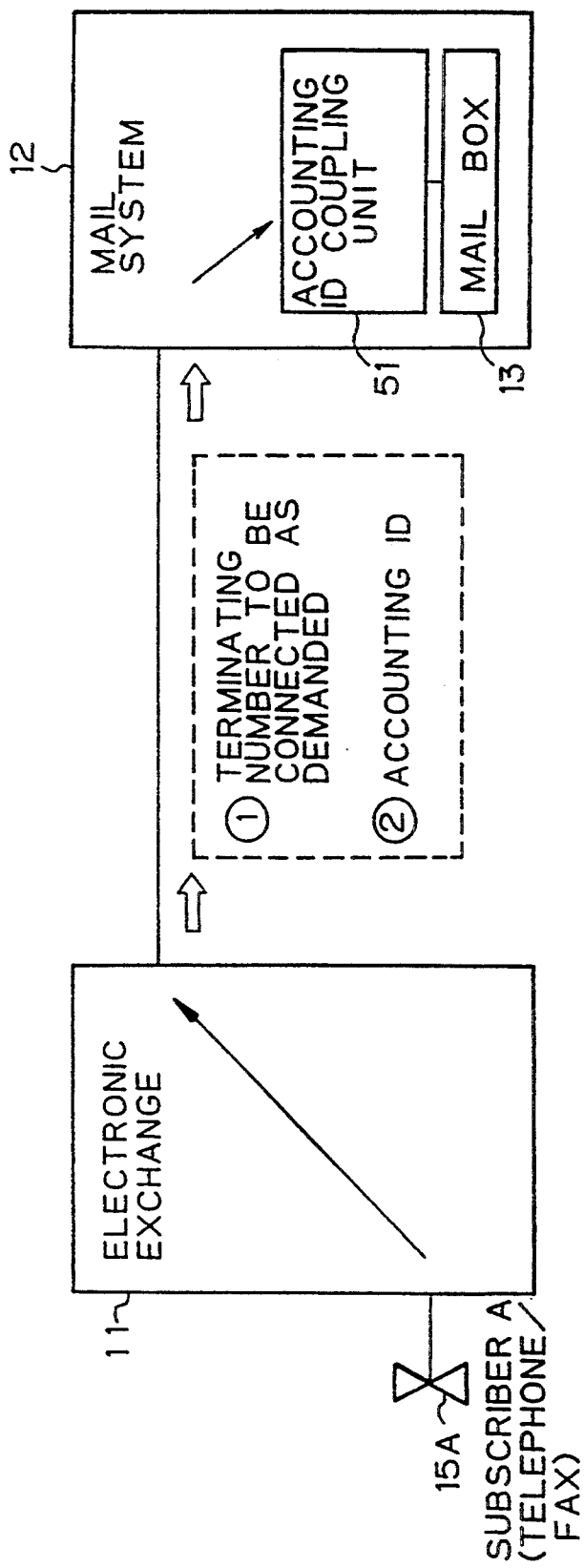
FIG. 6 is a schematic view for explaining a registration of a simultaneous broadcast service, according to the present invention.
Figure 7:
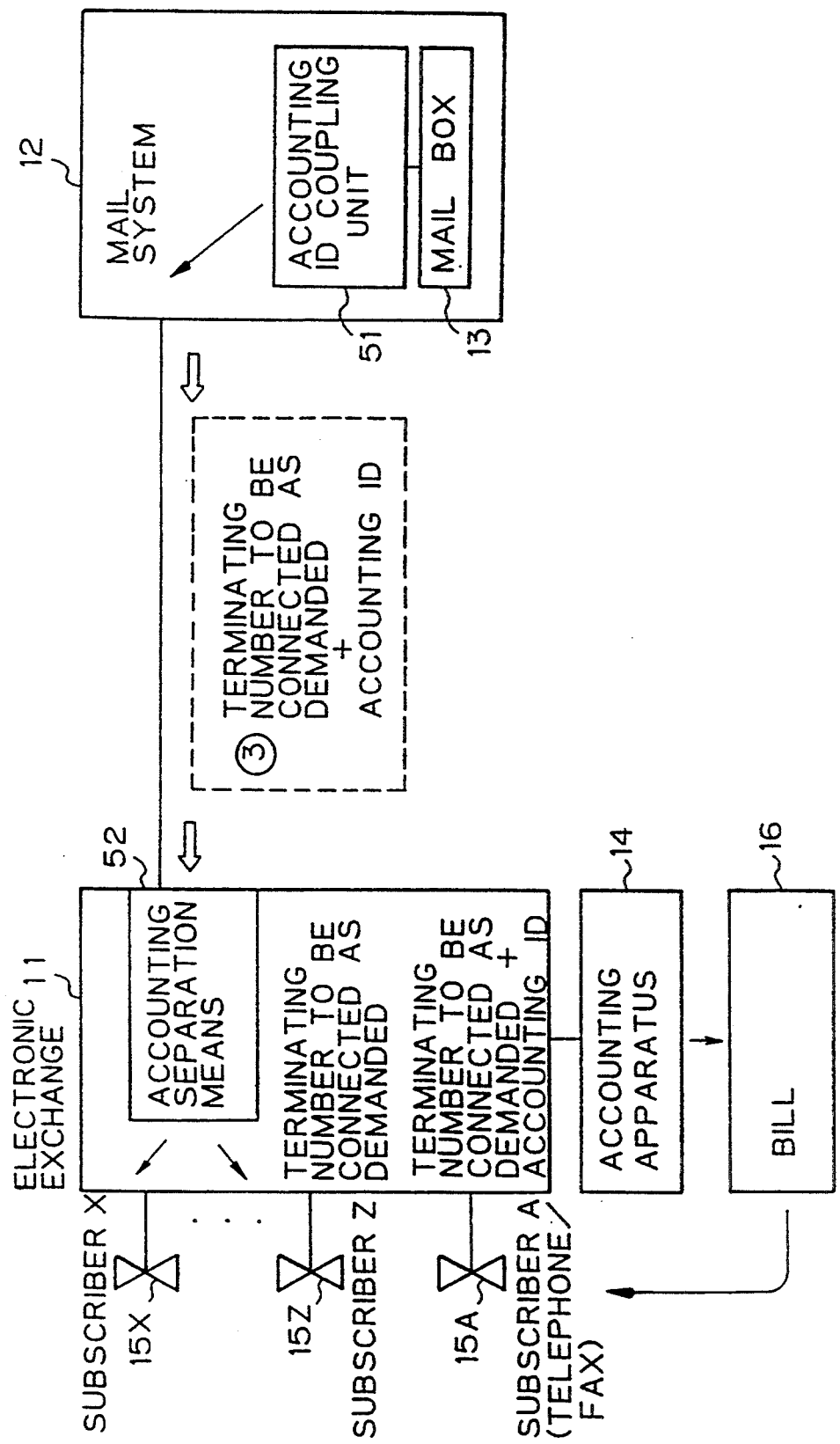
FIG. 7 is a schematic view for explaining an execution of the broadcast service and a generation of a bill.

FIG. 6 is a schematic view for explaining a registration of a simultaneous broadcast service, according to the present invention, and FIG. 7 is a schematic view for explaining an execution of the broadcast service and a generation of a bill. In FIGS. 6 and 7, as explained before, 11 denotes an electronic exchange, 12 a mail system (mail storage means), 51 a coupling means for coupling a terminating number to be connected and an accounting ID, the terminal number of which is ordered by a service demanding subscriber for registering the simultaneous broadcast service to be stored in the mail system. Means 52 is a separation means for separating the thus registered accounting ID from the thus registered terminating number to be connected and ordered by the service demanding subscriber, means 52 is located in the electronic exchange 11, 14 is an accounting apparatus, and 16 is a bill.

The present invention is constructed such that when a service demanding subscriber A commands the mail system 12 to perform a simultaneous broadcast, such as telephone information, FAX information and so on, the accounting ID of the service demanding subscriber A is registered in addition to each of the terminating numbers to be connected for the call terminating subscribers (subscribers X to Z) at the same time as the registration of the terminating numbers.

When the terminating subscribers X to Z for the simultaneous broadcast service are called, the accounting ID in addition to each of the call terminating numbers is sent to the electronic exchange 11. The electronic exchange 11 continuously calculates the fee for a call of the simultaneous broadcast service and registers the fee at the accounting apparatus 14. The subscriber to be charged the above bill 16 is determined to be a subscriber A, and is thus specified by the above accounting ID.

On one hand, the telephone exchange 11 is provided with telephones, FAX's and the like, and on the other hand, is directly connected with the mail system 12 and performs the simultaneous broadcast. The mail system 12 contains therein the accounting ID coupling means 51. Further, the electronic exchange 11 contains therein the accounting ID separation means 52 and the accounting apparatus 14 which receives information regarding a call, such as a call terminating number, a call originating number, call duration and so on, and, according to the information, calculates the related fee with reference to a charge table, to thereby issue the related accounting bill.

The subscriber A is a simultaneous broadcast demanding subscriber, and the transferring ends of the information are a plurality of subscribers X to Z. When a call originates from subscriber A, the related call is connected to the mail system 12 by a known method. In accordance with a known operation message from the mail system 12 and in compliance with conventional information such as a password, a classification of services, (specifically, the simultaneous broadcast in the present embodiment), the accounting ID is registered in the mail system 12, and the accounting ID indicates a subscriber to whom the fee is to be charged. In the mail system 12, the accounting ID is added, by the accounting ID coupling means 51, to every terminating number to be connected as demanded.

When a specified time comes for the broadcast, the mail system 12 generates the electronics exchange 11 to give the same the terminating numbers to be connected sequentially, each of which is added to the accounting ID. The electronic exchange 11 separates the accounting ID by the accounting ID separation means 52, from each of the thus given terminating numbers to be charged, and the electronic exchange 11 calls the call terminating subscribers in accordance with the respective terminating numbers to be connected, and thus the mail system 12 is connected with each of the call terminating subscribers. At the same time, the terminating numbers to be connected and the accounting ID are accumulated, together with the related call information, at the accounting apparatus 14. The accounting apparatus 14 calculates the fee based on the call information, with reference to the charge table, to thereby issue bills for each fee allocated the same accounting ID.

Figure 8:
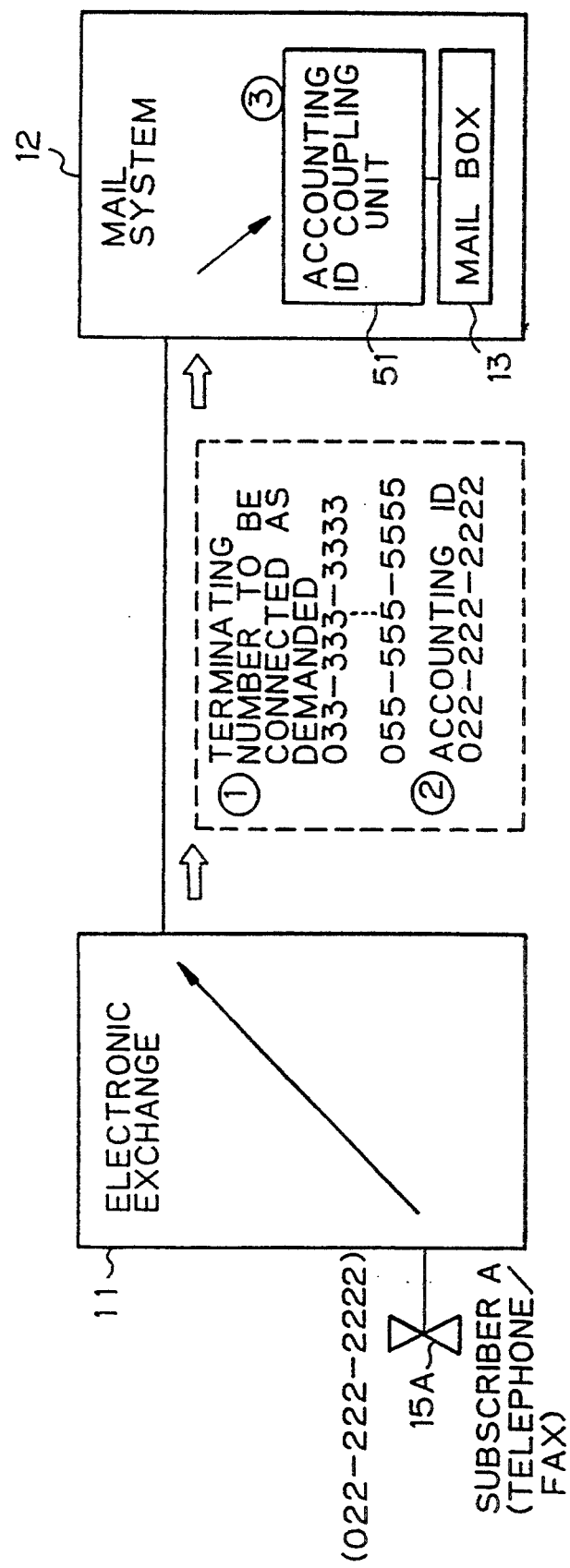
FIG. 8 is a schematic view for explaining the system of FIG. 6, with specific telephone numbers.
Figure 9:
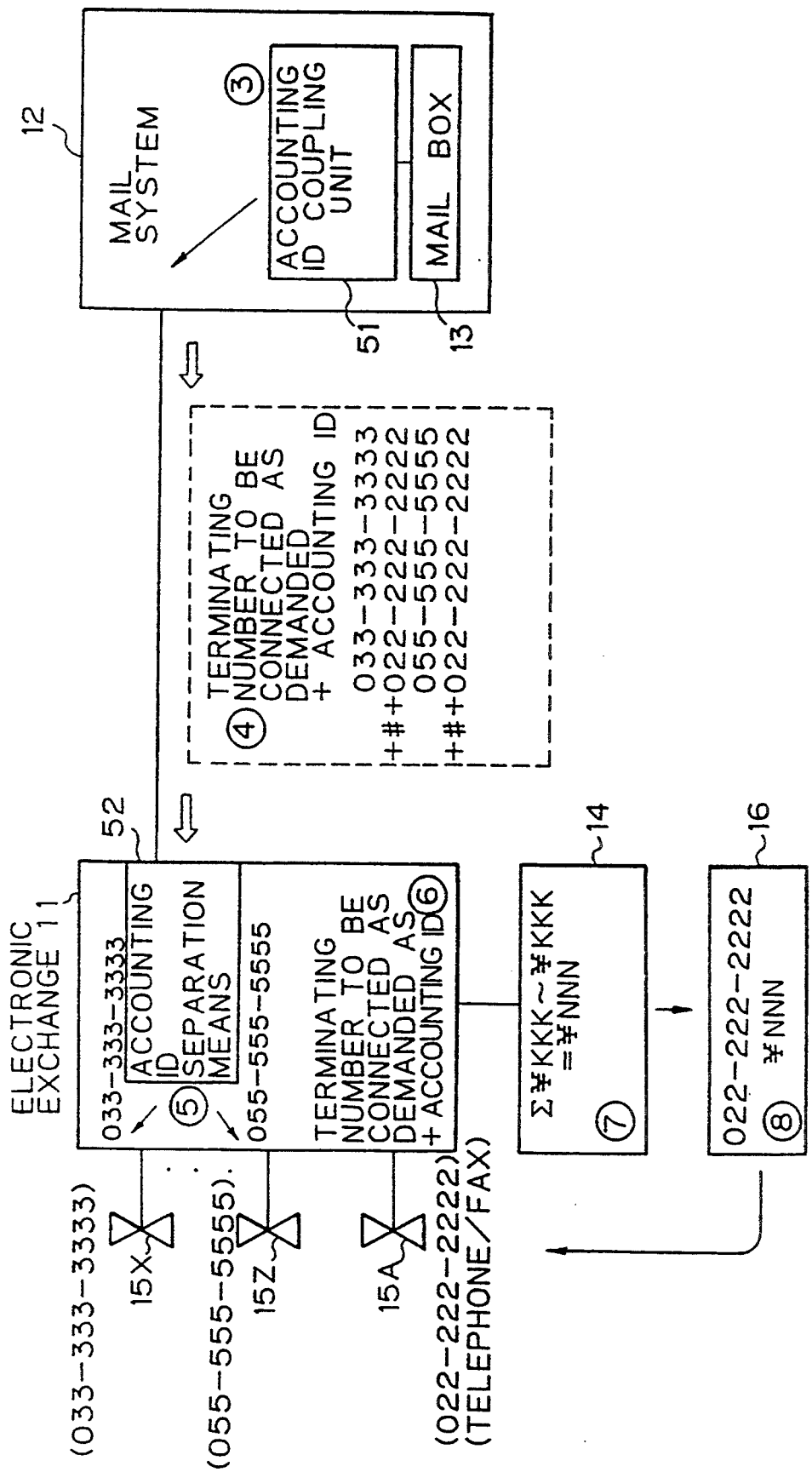
FIG. 9 is a schematic view for explaining the system of FIG. 7, with specific telephone numbers.

FIG. 8 is a schematic view for explaining the system of FIG. 6, with specific telephone numbers, and FIG. 9 is a schematic view for explaining the system of FIG. 7, with specific telephone numbers.

The above figures represent an example of the present invention, in which a simultaneous FAX broadcast is achieved by using a FAX mail system.

In the figure, the accounting ID (telephone number) of the subscriber A is assumed to be 022-222-2222 and the terminating numbers (telephone numbers) to be connected for the subscribers X to Z are assumed to be 033-333-3333 to 055-555-5555.

(1) The subscriber A registers, after connection of the same with the mail system 12, the terminating numbers to be connected, (i.e., 033-333-3333 to 055-555-5555) by using a push-button (PB) signal (refer to FIG. 5) or the like - - - <1>; further registers the accounting ID, i.e., 022-222-2222. - - - <2> A symbol # (PB signal) is inserted by the accounting ID coupling means 51 of the mail system 12 between each terminating number to be connected and the accounting ID for distinguishing the two, and the resultant information is stored. - - - <3>

(2) When sending the simultaneous broadcast information, each set of the thus stored information is sequentially given to the electronic exchange 11 by a known method. - - - <4> In the electronic exchange 11, the accounting ID separation means 42 discriminates the former numbers 033-333-3333 to 055-555-5555 by the inserted symbol #and connections are made to the call terminating subscribers X to Z according to the above former numbers. - - - <5> At the same time, each terminating number to be connected and the accounting ID, i.e., 022-222-2222, are sent to the accounting apparatus 14. - - - <6> Each set of accounting information related to each terminating number to be connected as demand, and recorded in the accounting apparatus 14, are then summed. - - - <7>, and the summed fee, i.e., Σ Yen KKK to Yen KKK = Yen NNN is recorded on the bill 16 corresponding to the accounting ID 022-222-2222. - - - <8> Thereafter, the bill is sent to the subscriber A.

Figure 11:
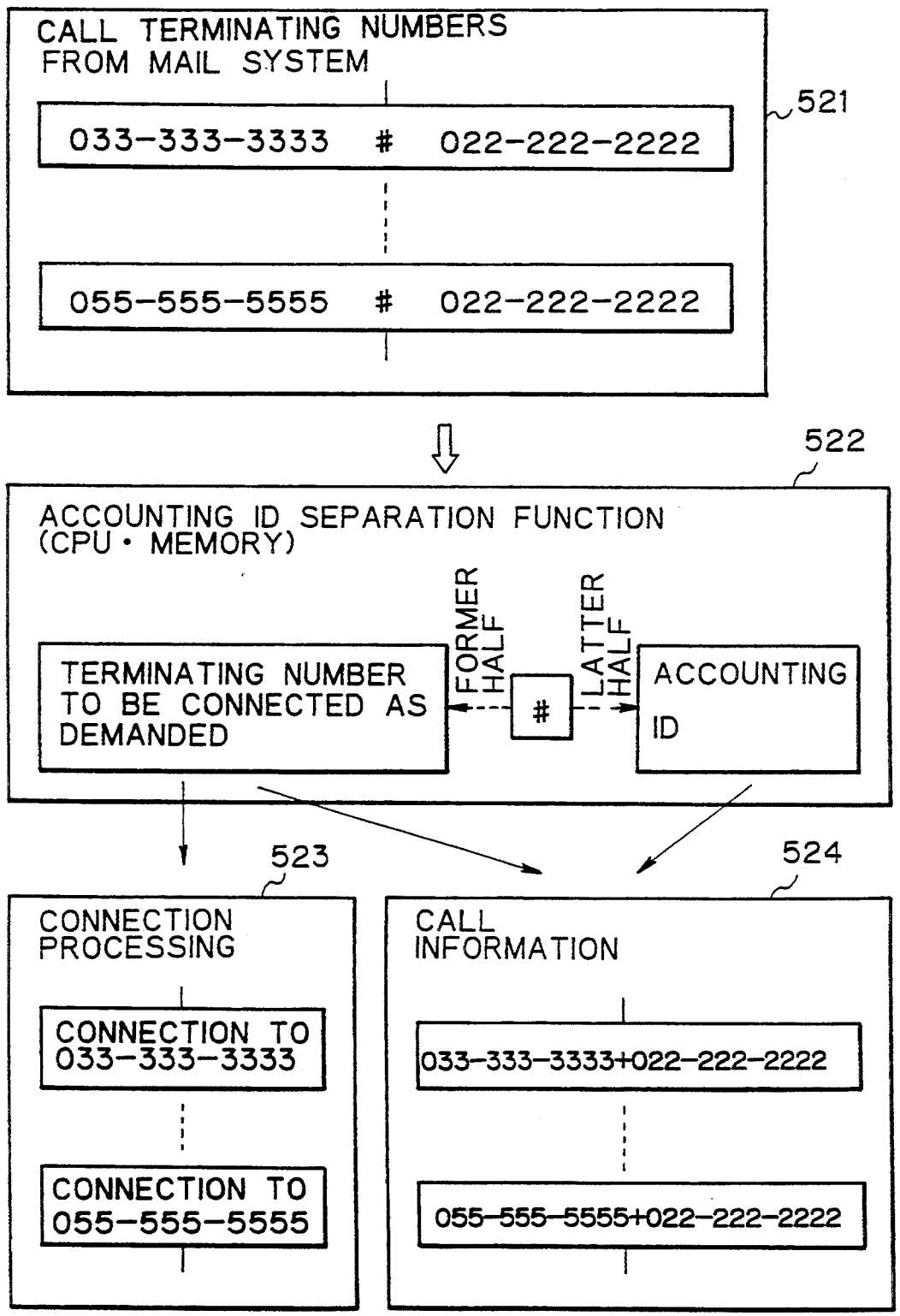
FIG. 11 is a schematic view of an accounting ID separation means.

Processing flow charts for the embodiment of the accounting ID coupling means 51 and the accounting ID separation means 52, both of the present invention, are shown in FIGS. 10 and 11.

FIG. 10 is a schematic view of an accounting ID coupling means, and FIG. 11 is a schematic view of an accounting ID separation means.

(1) Accounting ID coupling means (mail system)
Each terminating number to be connected for the subscribers X to Z and the accounting ID of subscriber A come, as input signals, from the electronic exchange 11. - - - (511) Under the accounting ID coupling function performed by a CPU, the symbol # is inserted to every terminating number to be connected while adding the accounting ID thereto. - - - (512) The terminating number to be connected and each added with the symbol #, and the accounting ID, are stored sequentially in a memory. - - - (513)

(2) Accounting ID separation means (electronic exchange)
The call terminating numbers each added with the terminating number to be connected and the accounting ID come from the mail system 12. - - - (521) Under the accounting ID separation function performed by the CPU and the memory, the terminating number to be connected constituting the former half part from the symbol # and the accounting ID constituting the latter half part from the same are separated from each other. - - - (522) According to each of the thus separated former half parts (i.e., the terminating numbers to be connected), a connection process is carried out for each of the respective terminating subscribers sequentially or simultaneously. - - - (523) The set of call information for each terminating number to be connected is stored at respective accounting ID's in the accounting apparatus 14. - - - (524)

Figure 12:
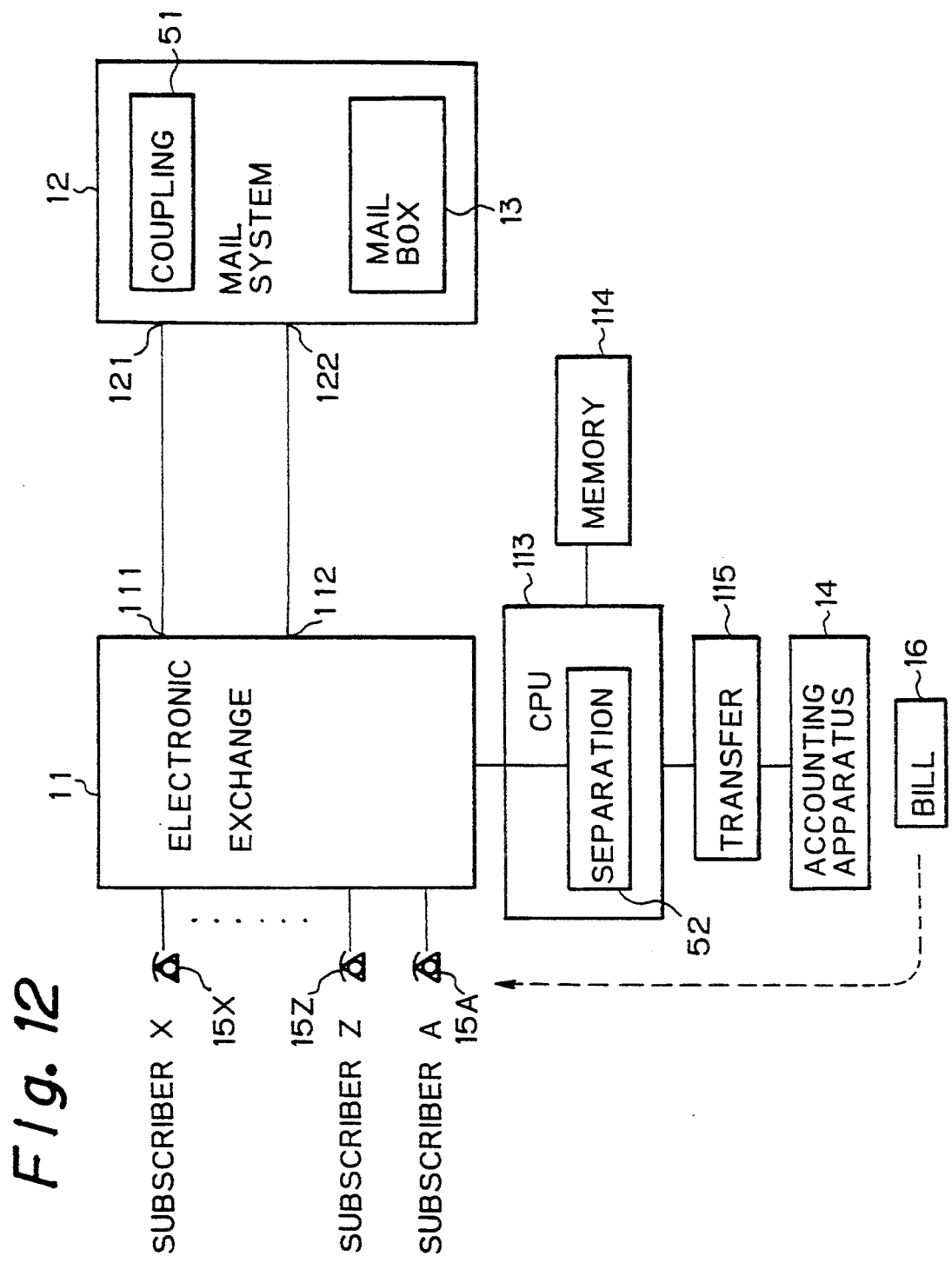
FIG. 12 is a block diagram of a switching system to which the present invention is applied.

FIG. 12 is a block diagram of a switching system to which the present invention is applied. In the figure, the electronic exchange 11 is provided with a line 111 for registration, a line 112 for reception, a processor (CPU) 113, a memory 114, and an accounting information transferring unit 115. The mail system 12 is provided with a line 121 for registration and a line 122 for transmission. The other elements have been already explained.

Figure 13A:
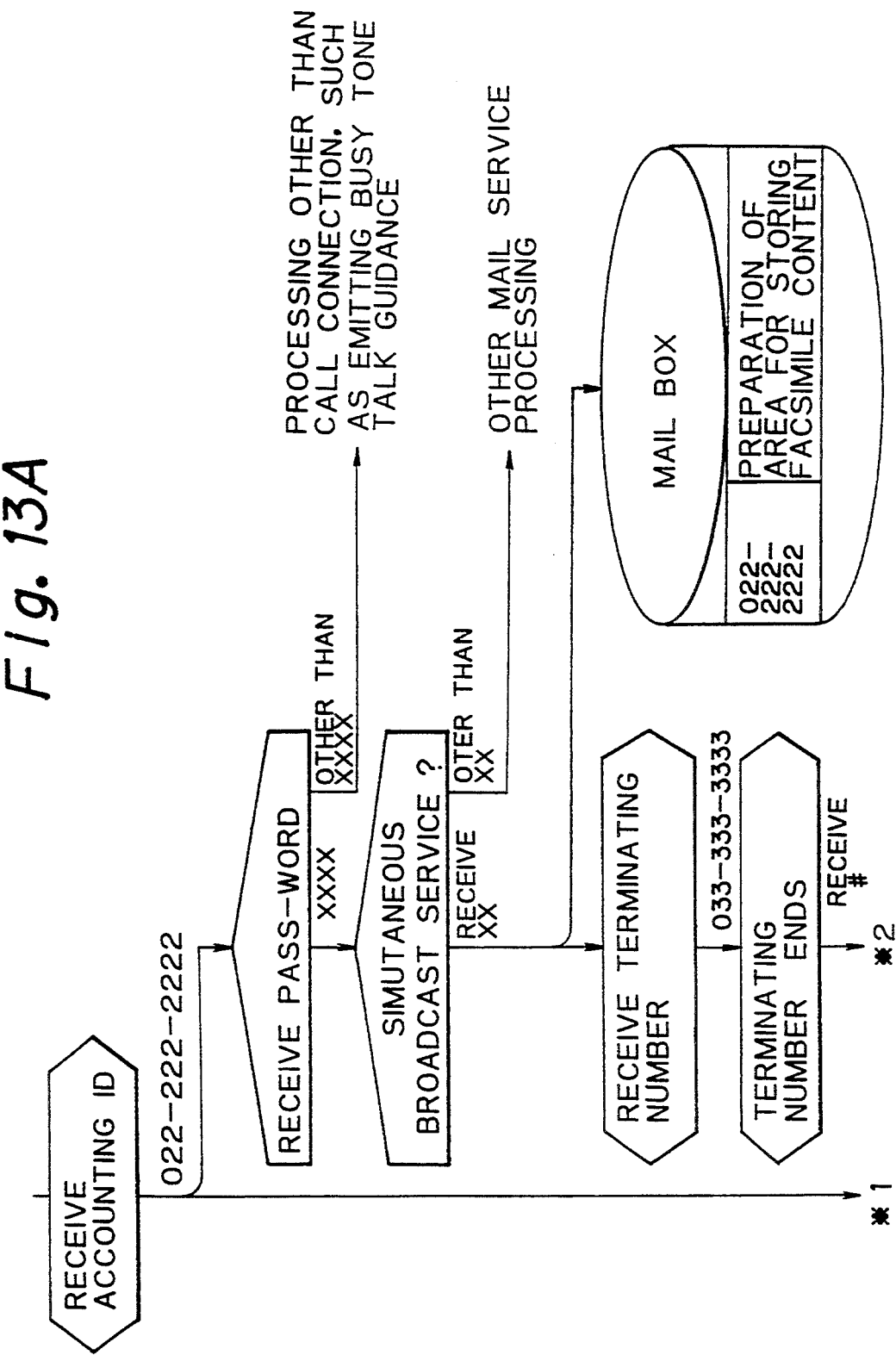
FIGS. 13A, 13B and 13C are schematic views for explaining a function of an accounting ID coupling means.
Figure 13B:
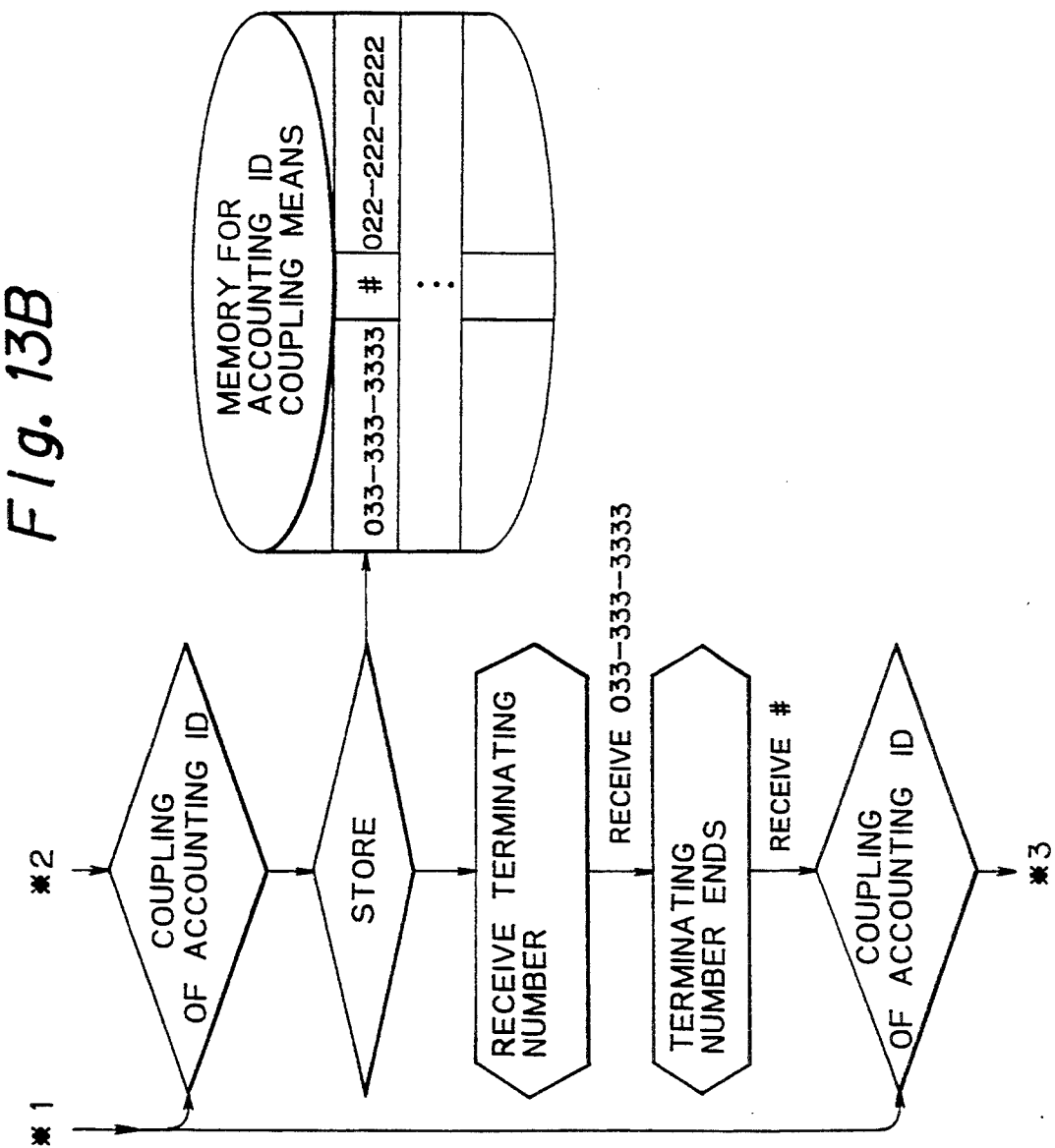
Figure 13C:
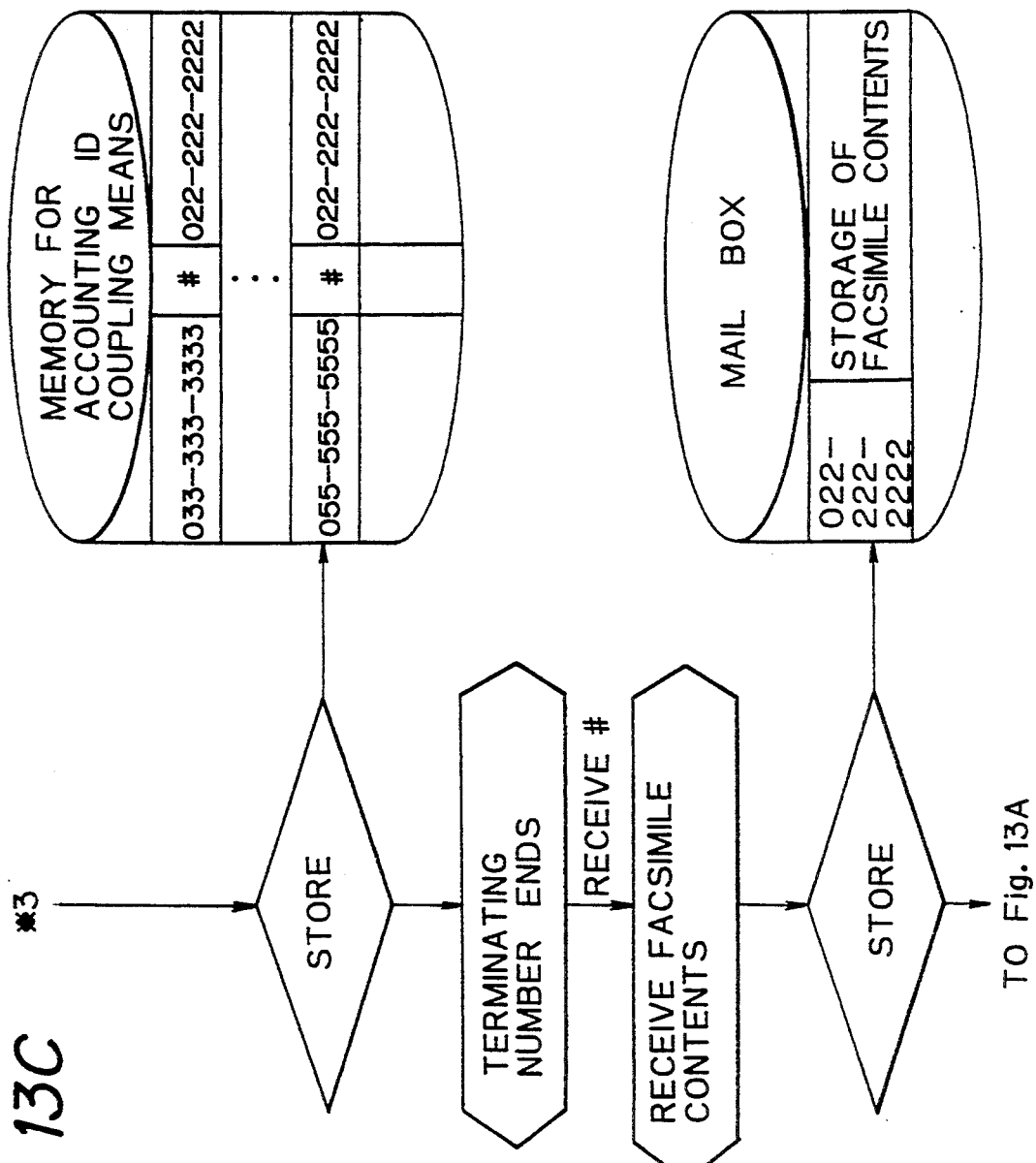
Figure 14C:
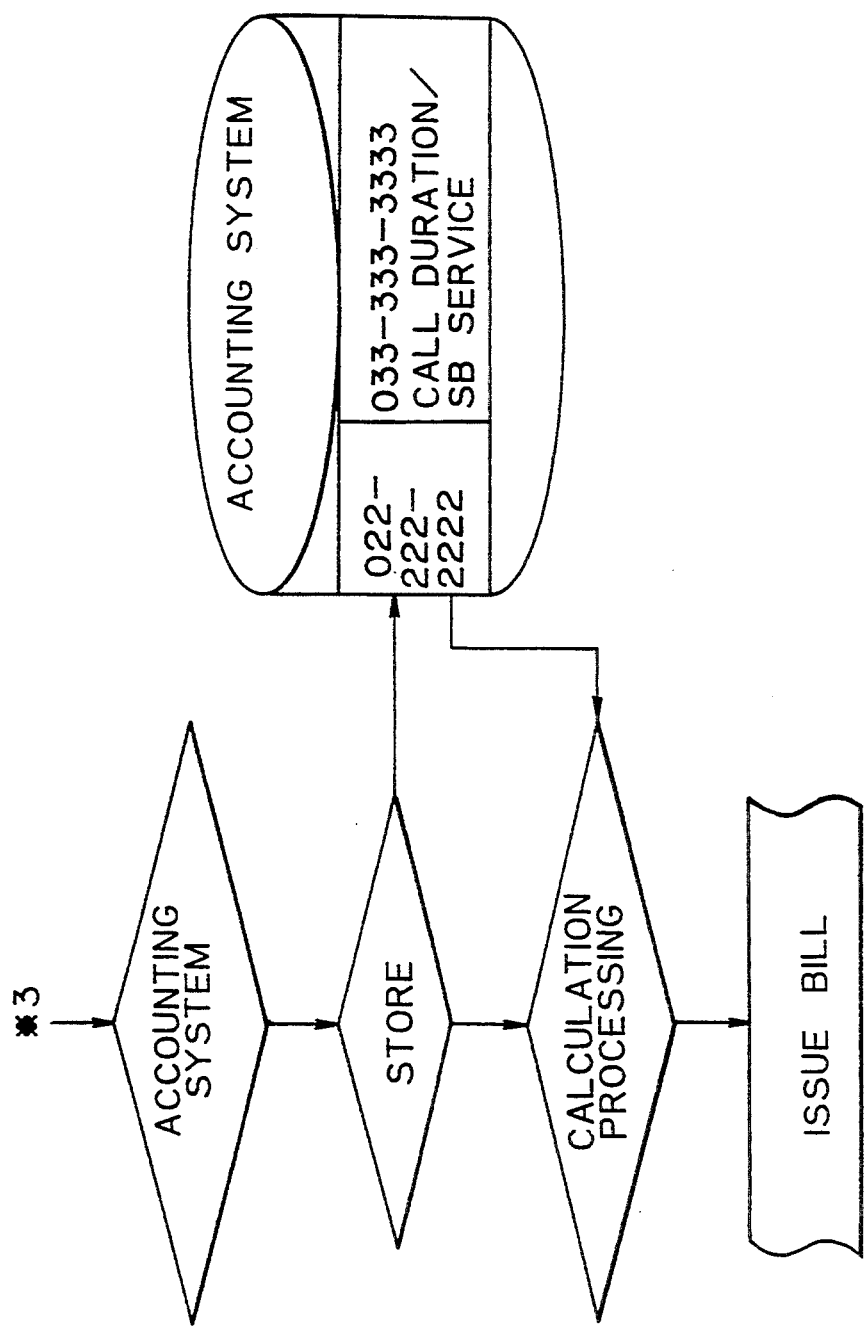

FIGS. 13A, 13B and 13C are schematic views for explaining a function of an accounting ID coupling means, and FIGS. 14A, 14B and 14C are schematic views for explaining a function of an accounting ID separation means.

Figure 15A:
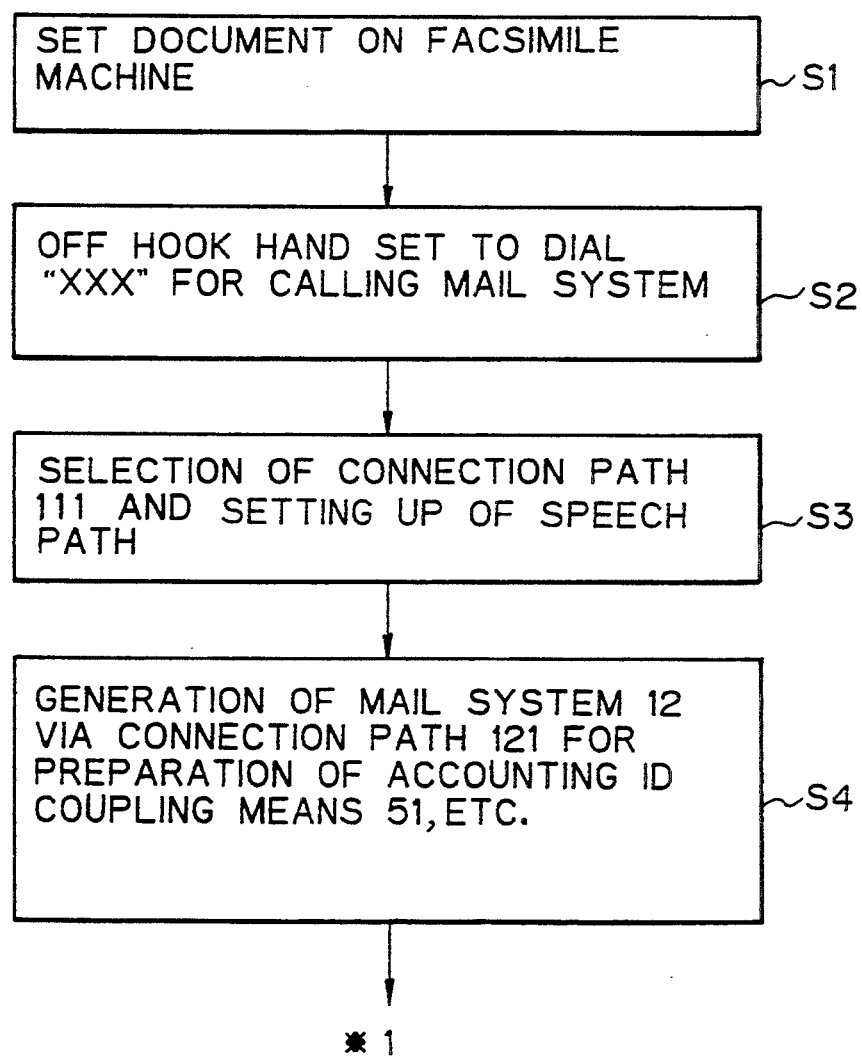
FIGS. 15A, 15B and 15C are flow charts revealing an example of an actual operation under the method according to the present invention.
Figure 15B:
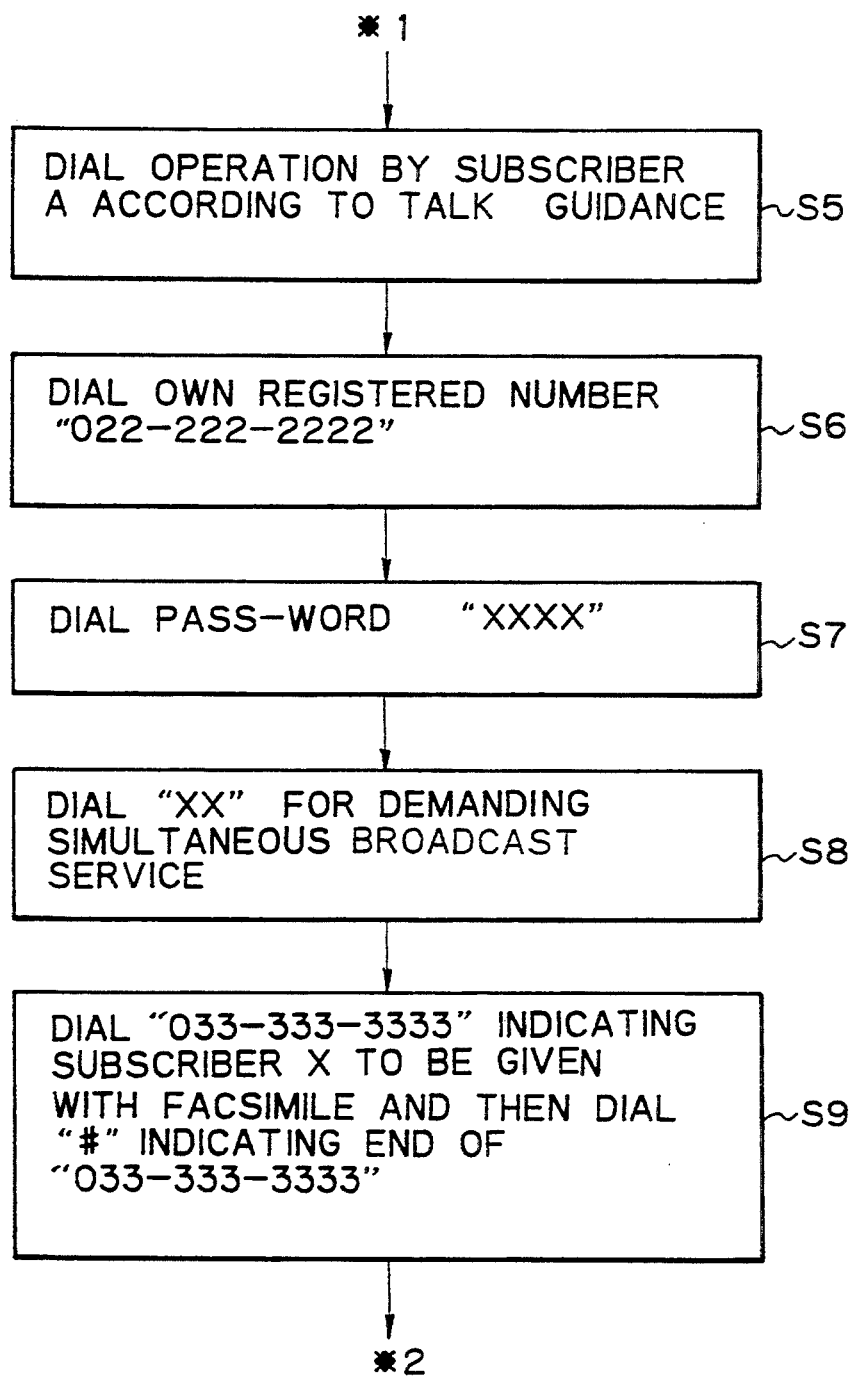
Figure 15C:
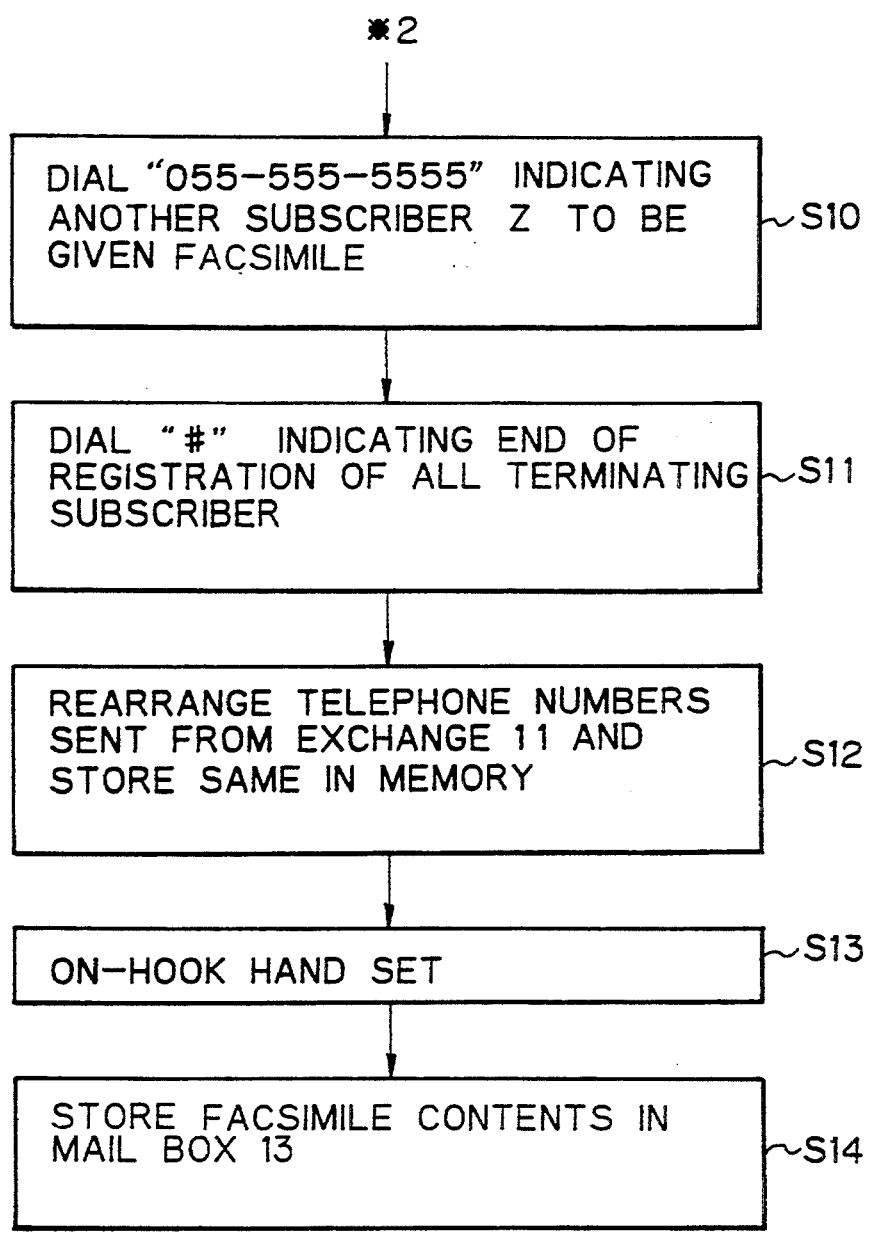

FIGS. 15A, 15B and 15C are flow charts revealing an example of an actual operation under the method according to the present invention.

Referring to FIGS. 15A, 15B and 15C, at step S1, the subscriber A sets the documents to be sent to the subscribers X, Y ....

At step S2, an off-hook operation of a hand set of the subscriber's terminal equipment 15A is made by the corresponding subscriber A.

At step S3, the selection of the path 111 is carried out by the electronic exchange 11 and a speech path is set up between the mail system 12 and the subscriber A.

At step S4, when the mail system 12 is generated, the mail system 12 starts receiving dialing numbers, setting up the accounting ID coupling means 51, and providing a talk guidance to operate the mail box 13.

At step S5, a number is dialed by the subscriber A.

At step S6, the subscriber A sends his own terminating or registered number. Note that the terminating number to be sent is not limited to his own number, but can be another terminating number corresponding to a person who will pay the related fee for the mail service.

At step S7, the password is given to prove that the call originating subscriber is allowed by the switching system to utilize the mail service.

At step S8, the dial "XX" is given from the above subscriber A.

At step S9, the dial is given from the subscriber A. The dial "#" may be replaced with "*".

At step S10, the dial is given from the subscriber A.

At step S11, the dial is given from the subscriber A. The dial "#" may be replaced with "*".

At step S12, the rearrangement is performed by the accounting ID coupling means 51 of the mail system 51.

At step S13, the on-hook operation is carried out by the subscriber A after pushing the button commanding a transmission of the facsimile.

At step S14, the facsimile contents are transferred, via the exchange 11, the line 111 and the line 121, to the mail box 13.

Figure 16A:
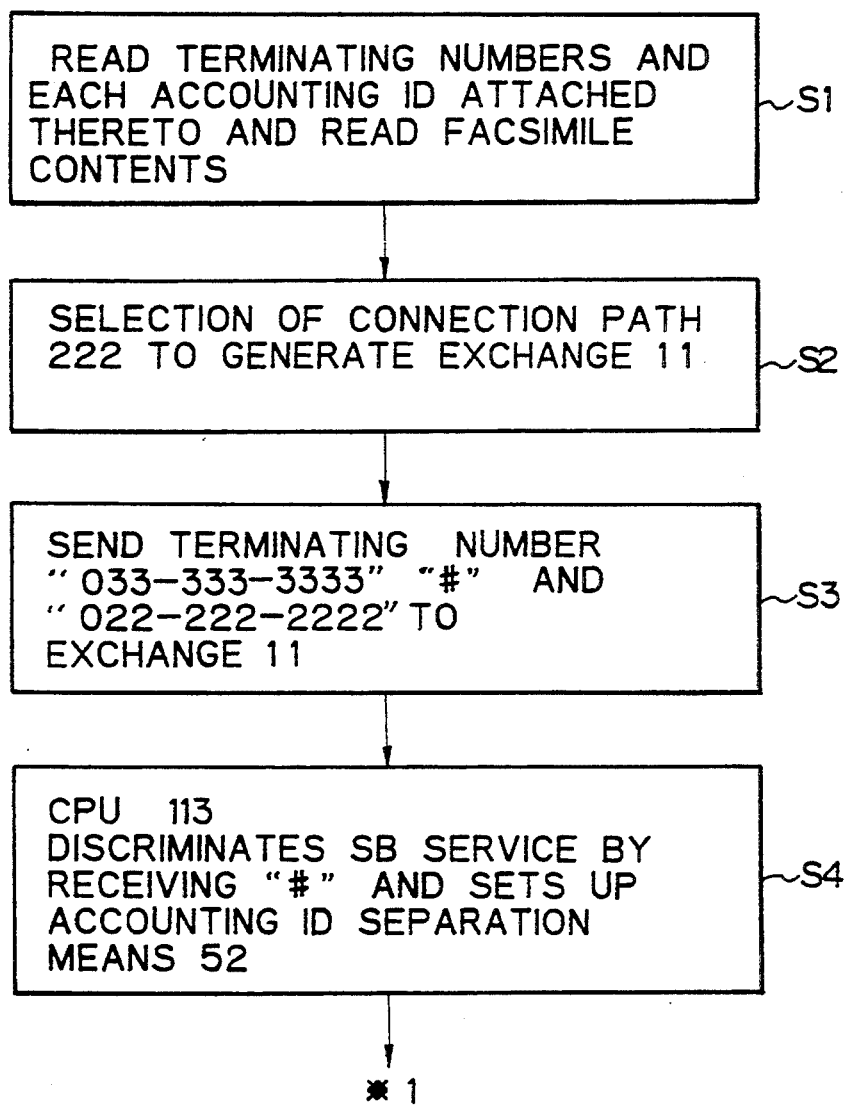
FIGS. 16A, 16B and 16C are flow charts revealing an example of actual operation of performing a simultaneous broadcast service and charging the related service fee.
Figure 16B:
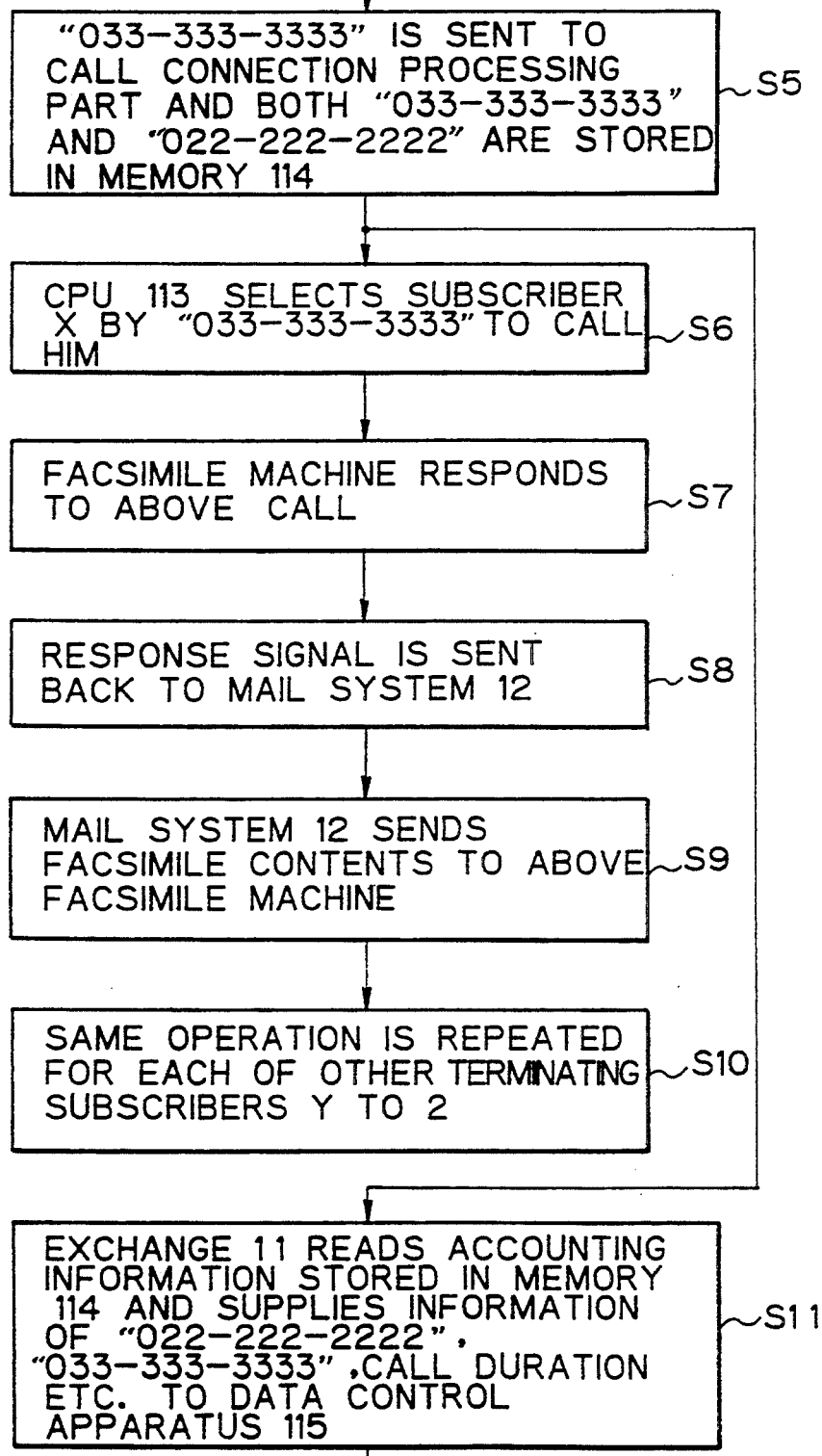
Figure 16C:
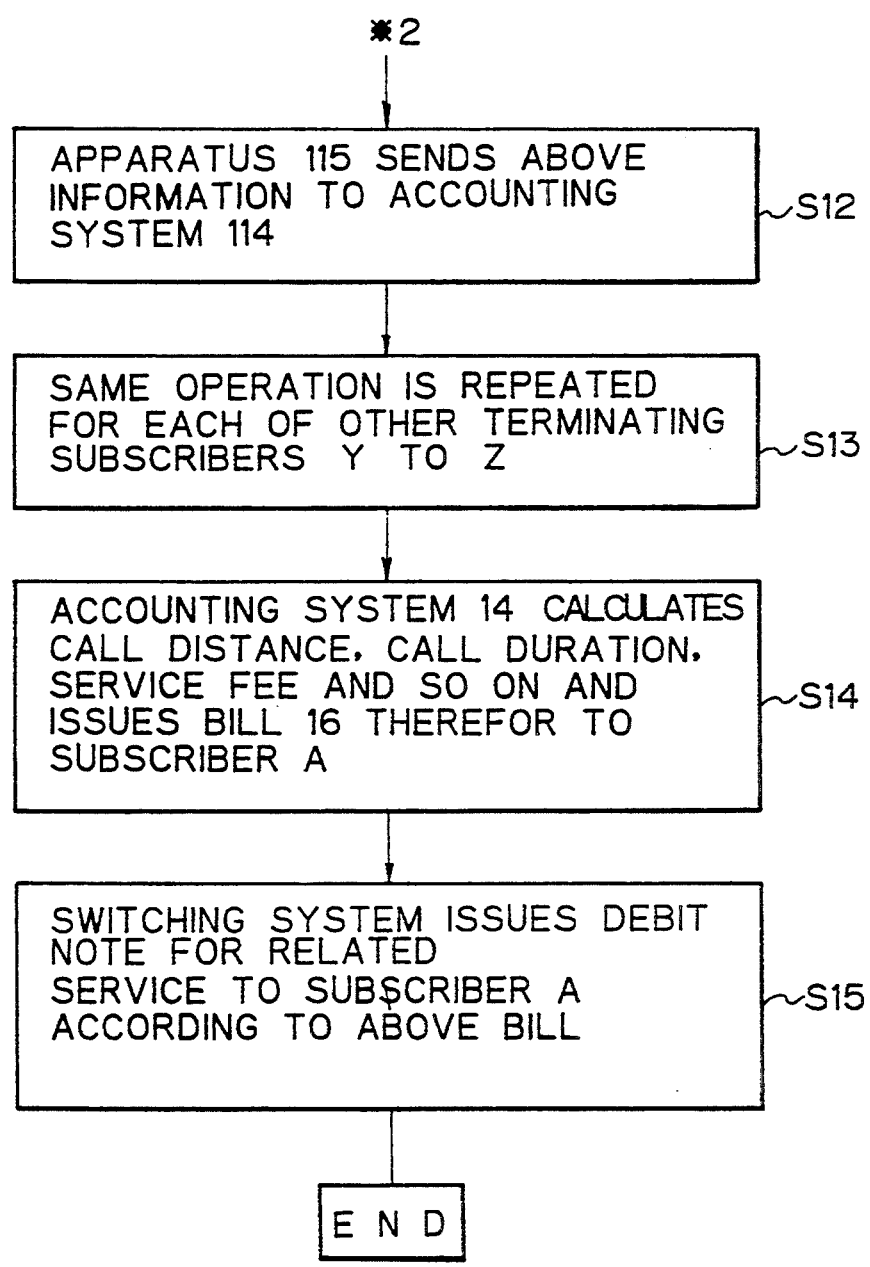

FIGS. 16A, 16B and 16C are flow charts revealing an example of actual performing of a simultaneous broadcast service and a charging of the related service fee.

Referring to FIGS. 16A to 16C, at step S1, a reading is carried out by the mail system 12. The terminating numbers and ID are stored in the memory of the accounting ID coupling means 51. The ID, in this example, indicates the aforesaid subscriber A. The read facsimile contents have been stored in the memory area allotted to A.

At step S2, the selection is made by the mail system 12.

At step S3, the sending of the numbers and "#" is made by the mail system 12 via the line 122.

At step S4, first the exchange 11 is generated by a signal given from the line 112, and then the CPU 113 is activated.

At step S5, the related operation is carried out by the accounting ID separation means 52.

At step S6, the call is made by way of the electronic exchange 11.

At step S7, the response is made automatically by the facsimile machine per se.

At step S8, the response signal is sent back from the terminal equipment 15X via the lines 112 and 122.

At step S9, the facsimile contents are stored in the mail box 13, and the stored contents are read and sent via the lines 122 and 112 to the facsimile machine 15X.

At step S11, the reading is made by a usual accounting information transmission means.

At step S12, the sending is made by a usual communication means for handling a transmission and reception of data between the apparatus 115 and the accounting system 14.

At step S14, the calculation is carried out for every subscriber X to Z.

As mentioned above, according to the present invention, a flexible accounting can be realized merely by adding, when a registration is performed, the accounting ID to each terminating number to be connected (call terminating number) even where a call originating exchange extension for the service demanding subscriber is different from a call originating exchange extension used for obtaining the related service; and further, a plurality of call terminating subscribers given with the service exist. Further, a selection number is not limited to the above example, (i.e., the insertion symbols #, *) but other recognition numbers also can be adopted.

I claim:

1. A method of accruing fees in a switching system for an electronic exchange mail service which includes a) an electronic exchange, b) subscribers' terminal equipment connected to said electronic exchange, c) mail storage means connected to the electronic exchange to provide a variety of mail services demanded by each call originating subscriber plurality of call originating subscribers to at least one call terminating subscriber of a plurality of subscribers, and d) accounting means connected to the electronic exchange, for accruing fees to be charged to a person specified by each call originating subscriber, said method comprising the steps of:
    (a) requesting the mail storage means to store data as mail from a first call originating subscriber of said plurality of call originating subscribers;
    (b) registering an accounting identification (ID) specified by the first call originating subscriber in the mail storage means and at least one call terminating number of the at least one call terminating subscriber to be provided with the mail;
    (c) sending 1) the at least one call terminating number of the at least one call terminating subscriber and 2) the registered accounting identification (ID) to the electronic exchange when the mail storage means calls the at least one call terminating subscriber;
    (d) performing a connection to said at least one call terminating subscriber to receive the mail in accordance with the at least one call terminating number sent from the mail storage means in the electronic exchange; and
    (e) sending accounting information to the accounting means containing both the at least one call terminating number and the accounting identification (ID) sent from the mail storage means to charge fees to a person identified by the accounting identification (ID) specified by the call originating subscriber.

2. A method as set forth in claim 1, wherein the step (b) further includes the step of adding a particular symbol added to distinguish the accounting identification (ID) from the terminating number of the plurality of subscribers, which particular symbol is used, in the electronic exchange, to separate the accounting identification (ID) from said terminating number.

3. A method as set forth in claim 2, wherein said particular symbol is a special code determined in advance in the switching system.

4. A method as set forth in claim 2, wherein said particular symbol is selected to be one of # and * from a telephone key pad for generating a push button signal.

5. A method as set forth in claim 4, wherein said particular symbol of # or * issued from the first call originating subscriber is used to distinguish the terminating number to be connected as demanded.

6. A method as set forth in claim 1, wherein said accounting information (ID) is expressed in the form of a telephone number.

7. A method as set forth in claim 1, further comprising the step of providing a simultaneous broadcast service to a plurality of specified call terminating subscribers.

8. A method as set forth in claim 1, wherein said mail service is provided sequentially to a plurality of specified call terminating subscribers.

9. A method as set forth in claim 1, wherein said mail service is provided to each of specified call terminating subscribers at respective specified time and day.

10. A method as set forth in claim 1, wherein said mail storage means is operated as at least one of a facsimile mail system and voice mail system.

11. A method as set forth in claim 1, wherein said mail storage means is included in terminal equipment of at least one subscriber.

12. An apparatus for accruing fees in a switching system for an electronic exchange mail service, comprising:
    an electronic exchange;
    a plurality of subscribers' equipment connected to said electronic exchange;
    mail storage means, connected to the electronic exchange, for providing a variety of mail services demanded by each call originating subscriber of a plurality of call originating subscribers to at least one call terminating subscriber of a plurality of subscribers;
    accounting means, connected to the electronic exchange, for charging fees to a person identified by an accounting identification (ID) specified by each of said call originating subscribers;
    first means operatively connected to the mail storage means, for registering an accounting identification (ID) to respective terminating numbers of respective call terminating subscribers of the plurality of call terminating subscribers to be given the mail service; and second means operatively connected to said first means and to the electronic exchange to receive said respective terminating numbers and said accounting identification (ID) from the first means and further connected to the accounting means through the electronic exchange, the second means also applying each of said terminating numbers from the mail storage means to the electronic exchange, and applying both the terminating numbers and a corresponding accounting identification (ID) from the mail storage means to said accounting means.

13. An apparatus as set forth in claim 12, wherein said first means comprises a coupling unit which operates to couple the terminating numbers with the accounting information (ID).

14. An apparatus as set forth in claim 13, wherein said second means comprises separation unit which operates to separate the accounting information (ID) from the respective terminating numbers, so that a terminating number is supplied to the electronic exchange, while both the terminating number and the corresponding accounting information (ID) are sent to the accounting means.

15. An apparatus as set forth in claim 12, further comprising the step of providing a simultaneous broadcast service to a plurality of specified call terminating subscribers.

16. An apparatus as set forth in claim 12, wherein said mail service is provided to a plurality of specified call terminating subscribers sequentially.

17. An apparatus as set forth in claim 12, wherein said mail service is provided to each of specified call terminating subscribers at a respective specified time and day.

18. An apparatus as set forth in claim 12, wherein said mail storage means operates as at least one of a facsimile mail system and voice mail system.

19. An apparatus as set forth in claim 12, wherein said mail storage means is included in terminal equipment of one or more subscribers.

* * * * *